United States Patent
Tomita

(10) Patent No.: US 8,346,939 B2
(45) Date of Patent: Jan. 1, 2013

(54) NETWORK SYSTEM, NETWORK CONNECTING DEVICE, AND NETWORK CONNECTING METHOD

(75) Inventor: Nobuyoshi Tomita, Tokyo (JP)

(73) Assignee: Sony Corporation, Tokyo (JP)

( * ) Notice: Subject to any disclaimer, the term of this patent is extended or adjusted under 35 U.S.C. 154(b) by 603 days.

(21) Appl. No.: 11/954,306

(22) Filed: Dec. 12, 2007

(65) Prior Publication Data

US 2008/0250151 A1    Oct. 9, 2008

(30) Foreign Application Priority Data

Dec. 27, 2006  (JP) ................... 2006-351734

(51) Int. Cl.
G06F 15/16 (2006.01)
G06F 15/173 (2006.01)
H04L 12/16 (2006.01)

(52) U.S. Cl. ........ 709/227; 709/225; 709/226; 709/229; 370/260; 370/270

(58) Field of Classification Search .................. 709/227, 709/229, 225, 226; 370/270, 260
See application file for complete search history.

(56) References Cited

U.S. PATENT DOCUMENTS

| | | | |
|---|---|---|---|
| 2002/0078388 A1* | 6/2002 | Wickham ...................... | 713/300 |
| 2004/0168081 A1* | 8/2004 | Ladas et al. .................... | 713/201 |
| 2005/0169195 A1* | 8/2005 | Luo et al. ....................... | 370/254 |
| 2006/0133414 A1* | 6/2006 | Luoma et al. .................. | 370/466 |
| 2007/0086394 A1* | 4/2007 | Yamada et al. ................ | 370/338 |
| 2008/0037444 A1* | 2/2008 | Chhabra ........................ | 370/254 |
| 2009/0080390 A1* | 3/2009 | Zhou et al. ..................... | 370/338 |

* cited by examiner

Primary Examiner — Peter Shaw
(74) Attorney, Agent, or Firm — Oblon, Spivak, McClelland, Maier & Neustadt, L.L.P.

(57) ABSTRACT

A network system that performs network connection between devices conforming to a predetermined communication standard is disclosed. The system includes client devices including first network starting units that present first identification information including an identifier decided in advance and designating a first network and start the first network and a server. The server includes a reading unit that reads the first identification information, an option presenting unit that presents, as an option of a network connection destination, a client device including the first identification information read by the reading unit, a first network joining unit that joins the first network when the option is selected, and a transmitting unit that transmits, in the first network, a communication encryption key for joining a second network and second identification information designating the second network to the selected client device.

8 Claims, 19 Drawing Sheets

FIG. 9

| Ap NETWORK SSID | Ae NETWORK SSID | MAC ADDRESS | DEVICE NAME | WEP KEY |
|---|---|---|---|---|
| SSID#1="WirelessDA ... | SSID#2="WirelessAdapter ... | ... | DLNA CLIENT 3 | WEP#2 |
| SSID#1="WirelessDA ... | SSID#2="WirelessAdapter ... | ... | DLNA CLIENT4 | WEP#2 |
| SSID#0=... | SSID#3=... | ... | ... | WEP#3 |

171

| byte offset | Contents |
|---|---|
| 0 | WKEY |
| 4 | Total Length (=40+k+s) |
| 8 | Client IP address |
| 12 | Subnet Mask |
| 16 | Default Gateway |
| 20 | DNS1 |
| 24 | DNS2 |
| 28 | WLAN Adapter IP address |
| 32 | Client port number for Upload command |
| 34 | Application port number for Upload command |
| 36 | Encrypt mode |
| 37 | Encrypted Key length 'k' |
| 38 | SSID length 's' |
| 39 | Reserved |
| 40 | Encrypted Key (k byte) |
| 40+k | SSID (s byte) |

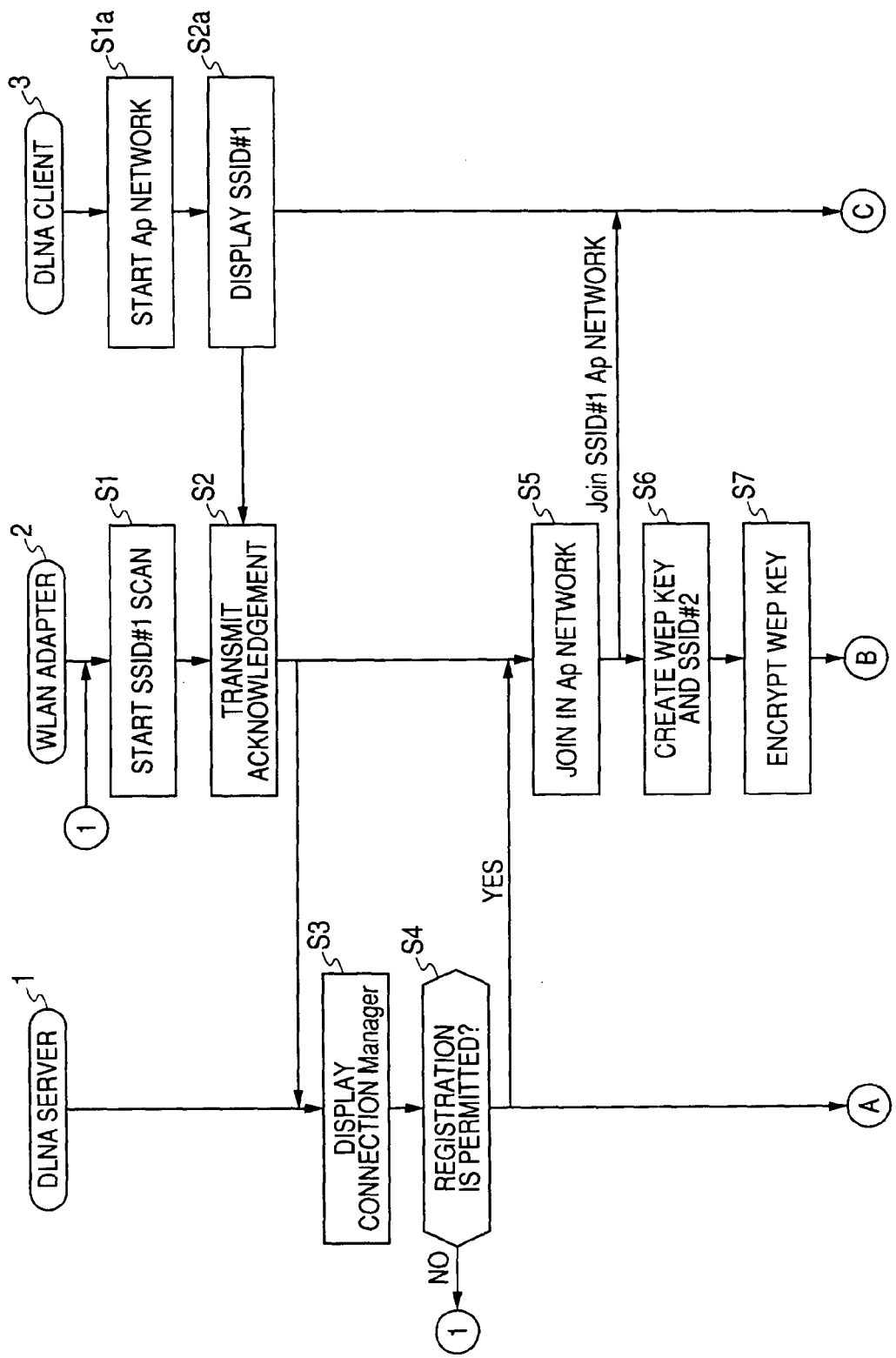

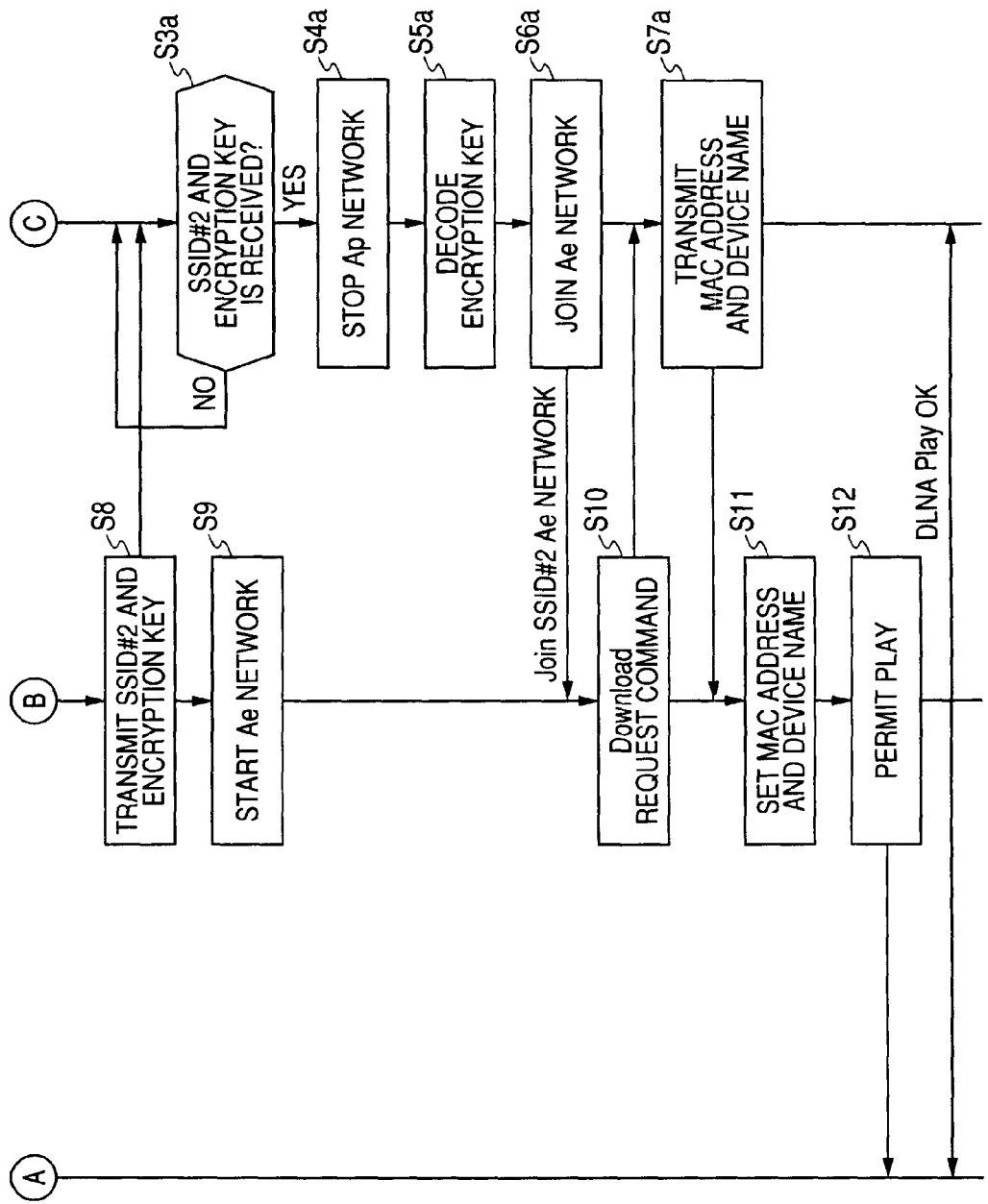

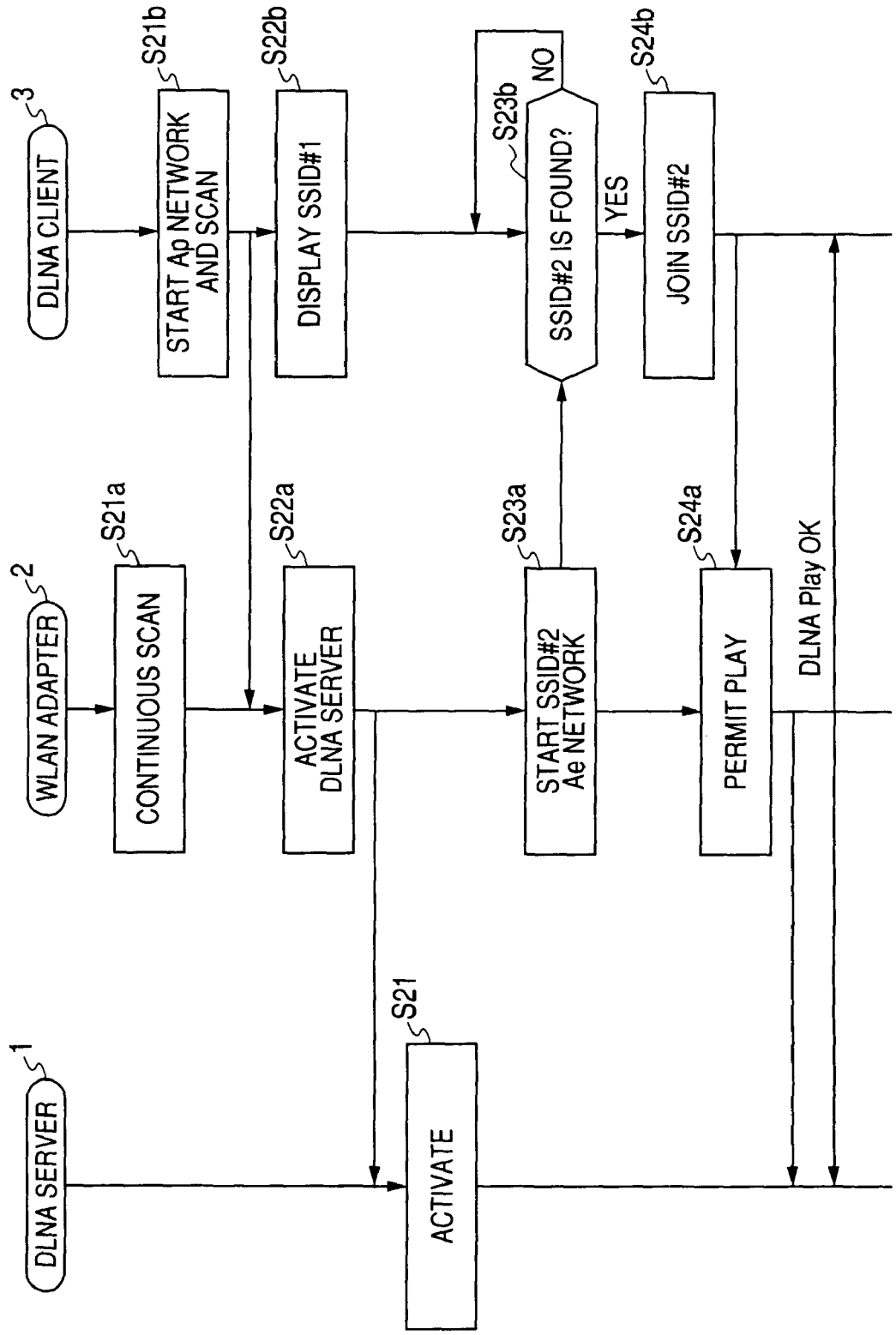

NETWORK SYSTEM, NETWORK CONNECTING DEVICE, AND NETWORK CONNECTING METHOD

CROSS-REFERENCES TO RELATED APPLICATIONS

The present invention contains subject matter related to Japanese Patent Application JP 2006-351734 filed in the Japanese Patent Office on Dec. 27, 2006, the entire contents of which being incorporated herein by reference.

BACKGROUND OF THE INVENTION

1. Field of the Invention

The present invention relates to a network system, a network connecting device, and a network connecting method, and, more particularly to a network system, a network connecting device, and a network connecting method for performing network connection.

2. Description of the Related Art

In recent years, according to the spread of personal computers (PCs) and the development of the Internet, many people access, using PCs in homes and work places, server devices provided on the Internet and download and use various content data or transmit and receive electronic mails. As the content data, it is also becoming more general to download audio data and video data through the Internet. For example, a technique for simultaneously providing, in a chat system for performing a chat through the Internet, plural people who participate in the chat with audio data in the same manner as text data and allowing the people to listen to the audio data is proposed (see, for example, JP-A-2005-242667).

As a new guideline for such a network, the DLNA (Digital Living Network Alliance) is known. In the DLNA guideline, a DMS (Digital Media Server) that records, accumulates, and provides contents and a DMP (Digital Media Player) that reproduces the contents are defined. A user can use both the DMS and the DMP simply by connecting the same to the network. The DMP finds out the DMS present in the network and automatically acquires a list of usable contents.

The user simply selects content that the user desires to view and listen to out of the prepared list of contents to automatically receive the content from the DMS. As the DMS, a PC, a home server, a DVD (Digital Versatile Disc)/HDD (Hard Disk Drive) recorder, and the like are assumed. As the DMP, a television, an AV (Audio Visual) component, a notebook PC, a PDA (Personal Digital Assistant), and the like are assumed. One device can have both the functions of the DMS and the DMP.

In the DLNA, Ethernet (registered trademark) or an IEEE (Institute of Electrical and Electronic Engineers) 802.11 wireless LAN is used as a transmission standard. TCP/IP (Transmission Control Protocol/Internet Protocol) is used as a communication protocol. DHCP (Dynamic Host Configuration Protocol) is used for dynamic allocation of addresses. HTTP (HyperText Transfer Protocol) is used for transmission and reception of contents. XML (eXtensible Markup Language) is used for description of messages transmitted and received between the DMS and the DMP. UPnP (Universal Plug & Play) is used for search for a usable server and acquisition of a content list.

In general, in the wireless LAN, since interception of communication content is easy, it is attempted to give safety same as that of wired communication to the wireless LAN by encrypting a packet to be transmitted and preventing an interceptor from knowing the content. Therefore, a WEP (Wired Equivalent Privacy) key or the like adopted as a security system of IEEE (Institute of Electrical and Electronic Engineers) 802.11b/g is used as encryption means. However, in the past, it is necessary to manually enter the WEP key. Since the WEP key has a large number of digits, a user has difficulty in correctly entering the WEP key. Further, since the user needs to keep the WEP key, it is also a lot of trouble to manage the WEP key.

There is also known a pairing system in which SETUP buttons are provided on a DMS side and a DMP side, respectively, a WEP key is exchanged between one device and the other device whose SETUP button is depressed in a predetermined time after the SETUP button of one device is depressed, and network connection is automatically established. However, when a third party depresses the SETUP button of a device with which users do not desire pairing, network connection is also established between the device and the other devices. Therefore, it is difficult to prevent intrusion of a malicious third party.

SUMMARY OF THE INVENTION

An embodiment of the invention provides a network system that performs network connection between devices conforming to a predetermined communication standard. The network system includes: client devices including first network starting units that present first identification information including an identifier decided in advance and designating a first network and start the first network; and a server including a reading unit that reads the first identification information, an option presenting unit that presents, as an option of a network connection destination, a client device including the first identification information read by the reading unit, a first network joining unit that joins the first network when the option is selected, and a transmitting unit that transmits, in the first network, a communication encryption key for joining a second network and second identification information designating the second network to the selected client device.

Another embodiment of the invention provides a network connecting device detachably provided in a server and used for network connection between devices conforming to a predetermined communication standard. The network connecting device includes: a reading unit that reads first identification information, which is transmitted from client devices, including an identifier decided in advance and designating a first network; an option presenting unit that presents, as an option of a network connection destination, a client device including the first identification information read by the reading unit to the server; a first network joining unit that joins the first network when the option is selected by the server; and a transmitting unit that transmits, in the first network, a communication encryption key for joining a second network and second identification information designating the second network to the selected client device.

BRIEF DESCRIPTION OF THE DRAWINGS

FIG. 9 is a diagram showing a client list;

FIG. 19 is a flowchart showing initial connection processing according to the second embodiment;

FIG. 20 is a flowchart showing the initial connection processing according to the second embodiment; and FIG. 21 is a flowchart showing reconnection processing according to the second embodiment.

DESCRIPTION OF THE PREFERRED EMBODIMENTS

Embodiments of the present invention will be hereinafter explained in detail with reference to the accompanying drawings. It is assumed that the present invention is applied to a content server system that uses a wireless LAN conforming to IEEE (Institute of Electrical and Electronic Engineers) 802.11x (11a/11b/11g). As an example of content data transmitted and received through this wireless LAN system, audio data applies.

[System Configuration]

Figure 1:
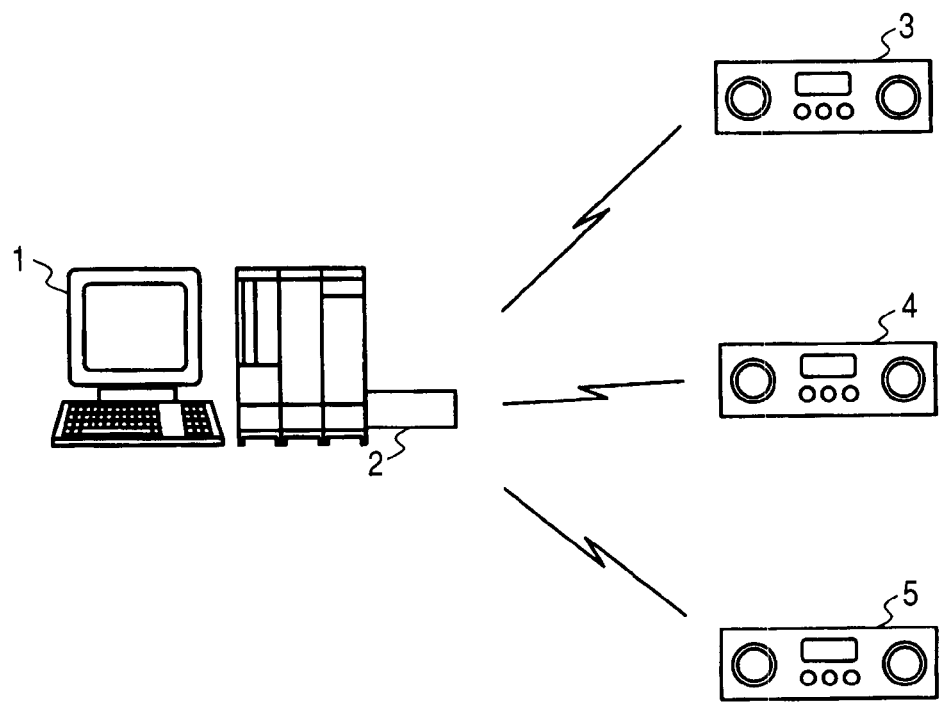
FIG. 1 is a diagram showing an example of a configuration of a content server system according to an embodiment of the present invention.

FIG. 1 is a diagram showing an example of a configuration of a content server system according to an embodiment of the present invention.

In the content server system shown in FIG. 1, a DLNA server 1 and DLNA clients (audio reproducing devices) 3 to 5 are connected through an ADHOC ENCRYPTED NETWORK (hereinafter referred to as "Ae network"). In other words, the DLNA server 1 and the DLNA clients 3 to 5 are directly connected peer-to-peer not through an access point.

The Ae network is a network used in performing DLNA audio reproduction. The DLNA server 1 starts the network and the DLNA clients 3 to 5 join the network.

A radio device uses an SSID (Service Set Identifier) in order to join the Ae network. The SSID is an identifier of an access point in a wireless LAN of an IEEE 802.11 series. The SSID is a peculiar name set for a network in order to avoid radio interference. Alphanumerics up to thirty-two characters can be arbitrarily set as the SSID.

A wireless LAN adapter (a connecting device) 2 is connected to the DLNA server 1. The DLNA server 1 performs wireless communication with the DLNA clients 3 to 5 through the wireless LAN adapter 2.

The DLNA server 1 is an information processing device such as a personal computer and has a function for connection to the wireless LAN adapter 2. The DLNA server 1 includes a reproducing device and the like for mass storage media such as an HDD (Hard Disk Drive) and optical disks such as a CD (Compact Disc) and a DVD (Digital Versatile Disk). The DLNA server 1 is capable of providing, through the wireless LAN adapter 2, the DLNA clients 3 to 5 with audio data stored in the HDD and audio data recorded in the CD and the DVD.

The wireless LAN adapter 2 is formed in, for example, a stick shape and detachably connected to a connection terminal of an external I/F of the DLNA server 1 via a USB (Universal Serial Bus) connector or the like. The wireless LAN adapter 2 has a broadband router function and conforms to IEEE 802.11x (11a/11b/11g).

When the wireless LAN adapter 2 is connected to the external I/F of the DLNA server 1, the DLNA server 1 can communicate with the DLNA clients 3 to 5 via the wireless LAN.

Moreover, even in a state in which a power supply for the DLNA server 1 is interrupted (e.g., when the DLNA server 1 is in a standby state), the wireless LAN adapter 2 can operate with a battery built therein. In this state, the wireless LAN adapter 2 searches for a DLNA client on the wireless LAN matching conditions determined in advance and, when a DLNA client matching the conditions is found, the wireless LAN adapter 2 can automatically turn on the power supply for the DLNA server 1 and activate the DLNA server 1.

Figure 2:
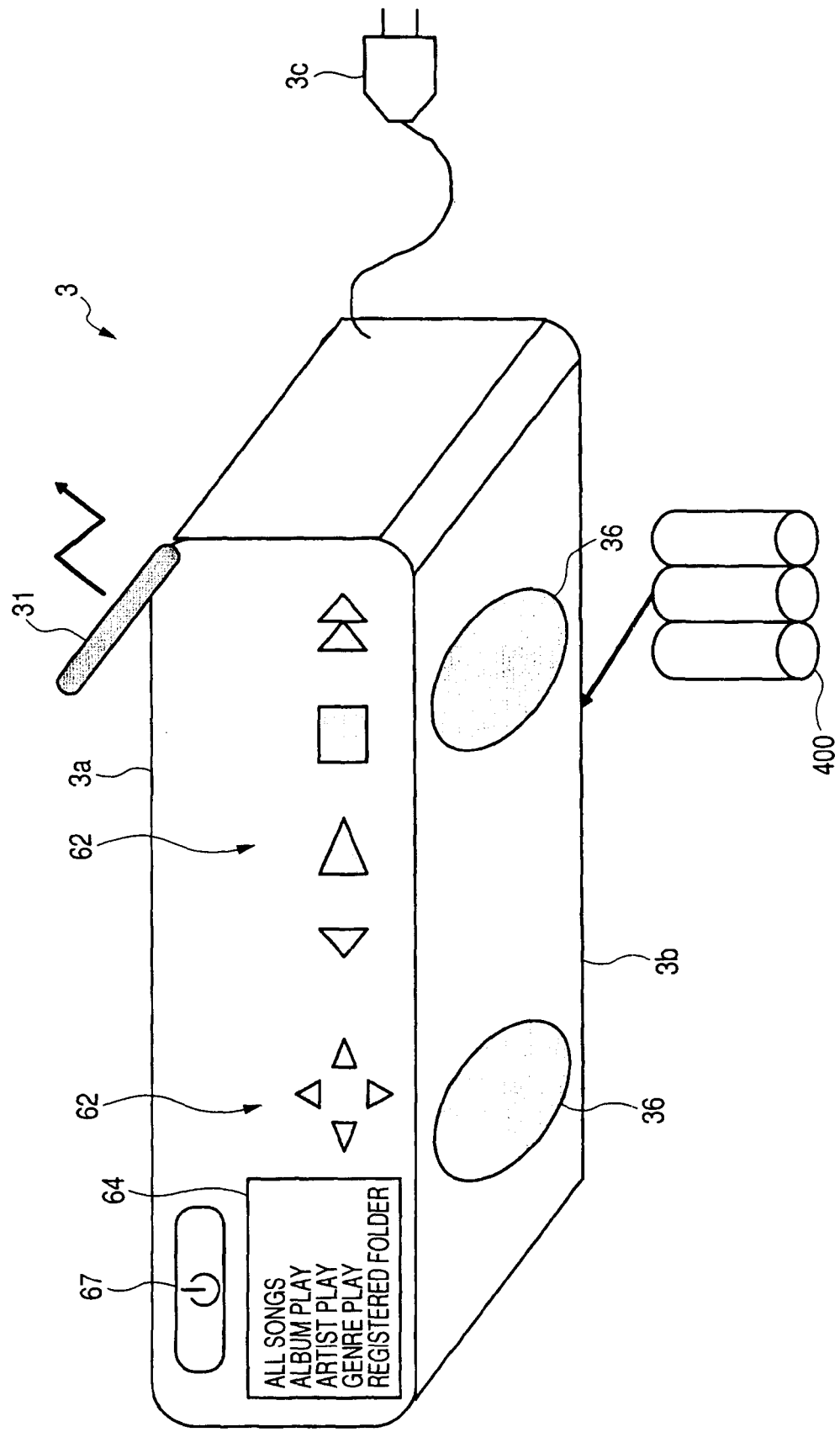
FIG. 2 is a perspective view showing a DLNA client.

Each of the DLNA clients 3 to 5 has a function for connection to the Ae network. FIG. 2 is a perspective view showing the DLNA client 3. In FIG. 2, an external appearance of the DLNA client 3 is shown. The DLNA clients 4 and 5 have the same external appearance.

The DLNA client 3 has a communication terminal 31, a key operation unit 62, a display unit 64, and a power switch 67 on an upper surface section 3a and has speakers 36 on a side section 3b. Functions of these units are described later.

The DLNA client 3 receives the supply of electric power via a socket 3c or has batteries 400 built in a not-shown battery built-in section to receive the supply of electric power. The DLNA client 3 operates by receiving the supply of electric power in this way.

The DLNA clients 3 to 5 also have a function of receiving audio data provided through the wireless LAN adapter 2, decoding the audio data, and reproducing the audio data. The DLNA clients 3 to 5 may have a function of reading out and reproducing audio data recorded in a CD or receiving and reproducing a radio broadcast signal.

As described above, the DLNA server 1 according to this embodiment has a function of an information providing device that provides audio data. The DLNA clients 3 to 5 according to this embodiment have a function of client devices (information reproducing devices) that receive the provision of the audio data from the DLNA server 1 and reproduce the audio data.

The user can enjoy different audio contents provided by the DLNA server 1 using each of the DLNA clients 3 to 5.

Moreover, the DLNA clients 3 to 5 according to this embodiment are so-called network joining type electronic devices that are applicable to, for example, UPnP (Universal Plug & Play) released by Microsoft Corporation in the United States in order to facilitate connection among electronic devices.

The UPnP is a specification of a protocol group including IP and TCP, UDP (User Datagram Protocol), and the like on the IP and a data format that can be used on an IEEE (Institute of Electrical and Electronic Engineers) 802 network representative in network communication employing Ethernet (registered trademark) of 10/100BASE-T. The UPnP expands functions in Internet standard communication (TCP/IP communication).

The UPnP is adopted in a so-called CE (Consumer Electronics) device such as a DLNA client to allow the CE device such as the DLNA client to easily authenticate with other CE devices and personal computers each other and easily and properly perform provision of services through a network and execution of the provided services without causing a user to perform troublesome work.

[Overview of UPnP]

Figure 3:
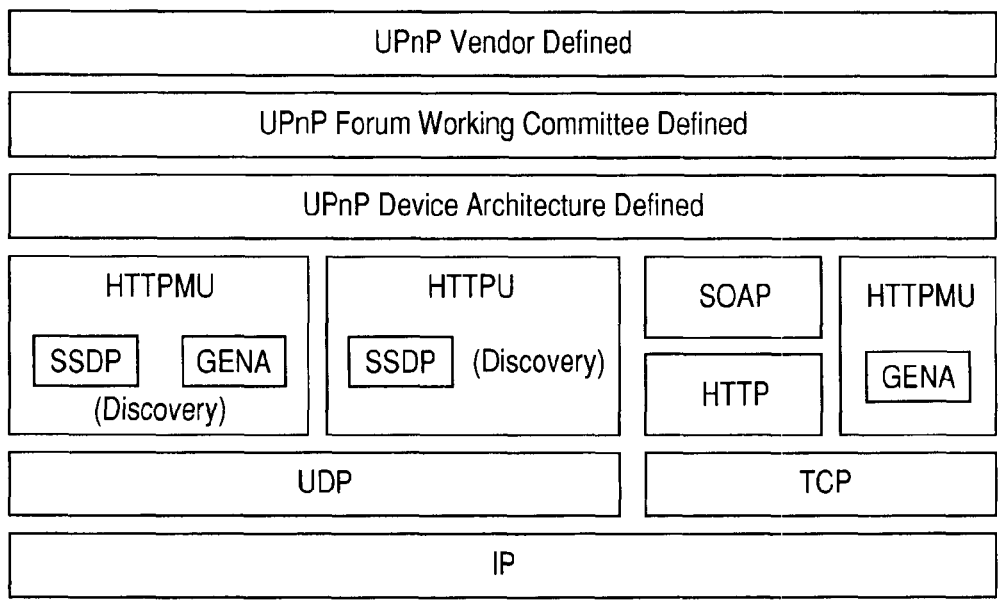
FIG. 3 is a diagram for explaining a protocol stack (the structure of a protocol group) of UPnP.

FIG. 3 is a diagram for explaining a protocol stack (the structure of a protocol group) of the UPnP.

As shown in FIG. 3, in the UPnP, actual transmission and reception of data are performed according to an Internet standard communication protocol. In order to realize functions unique to the UPnP explained below, a protocol group including SSDP (Simple Service Discovery Protocol), GENA (General Event Notification Architecture), SOAP (Simple Object Access Protocol), and HTTP (HyperText Transfer Protocol) is used.

In the UPnP, as shown in FIG. 3, UPnP Vendor Defined, UPnP Forum Working Committee Defined, and UPnP Device Architecture Defined are set.

The UPnP provides six functions, i.e., addressing, discovery, description, control, eventing, and presentation. The six functions provided by the UPnP are explained below.

A UPnP device (an electronic device in which the UPnP is installed) such as a DLNA client conforms to a rule called a UPnP/AV architecture in order to use audio data by using the functions of the UPnP. UPnP devices in the UPnP/AV architecture are classified into three types as described below.

In the UPnP/AV architecture, the UPnP devices are classified into three types, i.e., a media server that provides contents, a control point that functions as a control terminal device, and a media renderer that functions as a reproducing device. The media server is equivalent to a device that is generally called server device in a network system. The media renderer is equivalent to a device that is generally called client device in the network system.

The control point (the control terminal device) can control the respective UPnP devices connected to the network. The function of the control point can also be installed in the media server and the media renderer. The control point can be mounted on all electronic devices constituting the network or can be mounted on arbitrary electronic devices constituting the network. In this embodiment, as an example, the function of the control point is installed in all of the DLNA server 1 and the DLNA clients 3 to 5.

The addressing in the UPnP is a function with which the respective UPnP devices acquire addresses for specifying the UPnP devices themselves on the IEEE 802 network. DHCP (Dynamic Host Configuration Protocol) or Auto-IP is used for the addressing.

The discovery is performed after the addressing. With the discovery, the control point can discover a target device (media server or media renderer) controlled by the control point. A protocol used in the discovery is the SSDP described above. When each of the electronic devices constituting the network system is connected to the IEEE 802 network, the electronic device broadcasts a message for notifying devices included in the electronic device and services provided by the electronic device onto the IEEE 802 network (transmits a packet without designating a destination). The control point can learn what kind of device is connected to the IEEE 802 network by receiving the broadcasted message.

In the SSDP packet outputted by the electronic device to be controlled discovered by the control point in the discovery, a URL (Uniform Resource Locator) of a device description is described. The control point can acquire more detailed device information of the electronic device from the device description by accessing the URL.

This device information includes a service description in which icon information, a model name, a producer name, a product name, and detailed information on services provided by the device are described. From the device description and the service description, the control point can learn a method of access to the target device. The device description and the service description are represented in the XML (eXtensible Markup Language).

Functions of the control are roughly classified into two functions, i.e., action and query. The action is performed by a method defined in action information of the service description. The control point can operate the target device by invoking the action. The query is used for extracting a value of device information (state variable) of the service description. In the control, a transport protocol called SOAP described above is used and the XML is used as representation of the control.

The eventing is used for notifying, when the value of the device information is changed, the control point to that effect from the target device. The control point can learn a variable held by the target device from the device information by analyzing the service description of the target device. When the variable is changed, the control point can receive a notice from the target device. In the eventing, a transport protocol called GENA described above is used. The XML is used as representation of the eventing.

The presentation is used for providing the user with control means employing a user interface. The user can obtain a presentation page described in the HTML by accessing a presentation URL described in the device description. The function of the presentation makes it possible to prepare an application in the target device.

Each of the UPnP devices can not only join, without requesting the user to perform complicated operation, the network and perform communication but also automatically perform detection of the other UPnP devices and connection to the other UPnP devices by using the UPnP functions described above.

Figure 4:
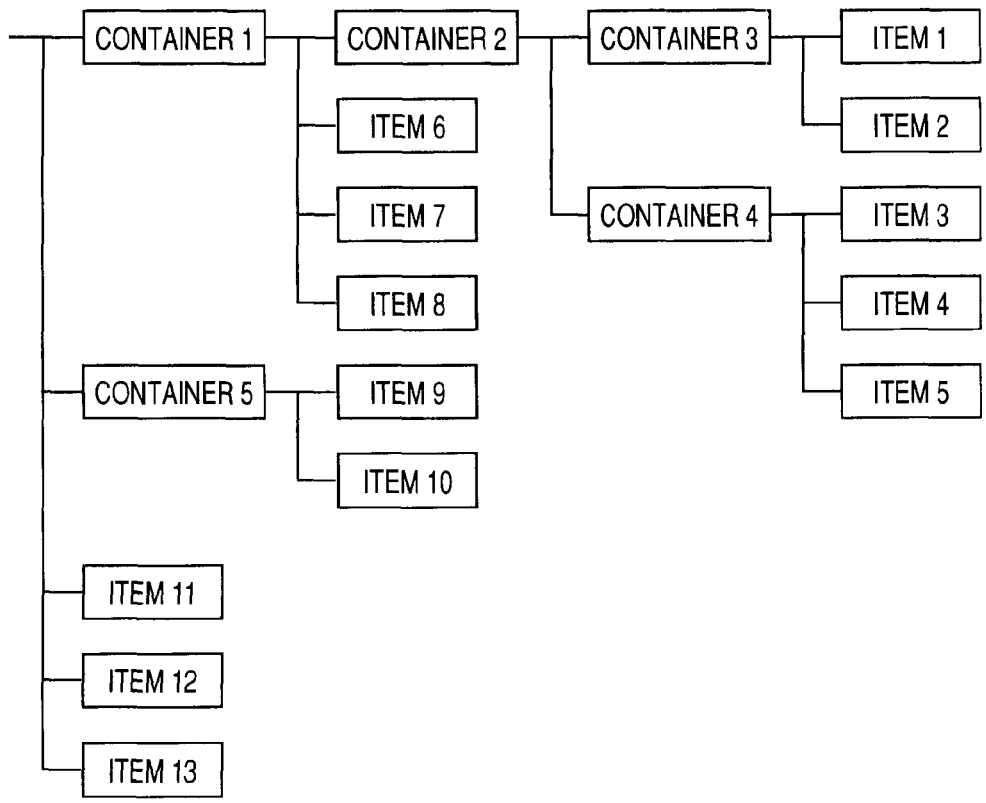
FIG. 4 is a diagram showing an example of a tree structure for managing contents stored in a media server.

FIG. 4 is a diagram showing an example of a tree structure for managing contents stored in the media server.

In the media server as a UPnP device, a function (service) called CDS (Contents Directory Service) is installed. The media server notifies, with this function, the control point how contents are stored in the media server. The CDS includes two abstracted objects called container and item. The container and the item are equivalent to a folder and a file in WINDOWS (registered trademark) that is an OS (Operating System) provided by Microsoft Corporation in the United States, respectively. Containers and items typically form a tree structure as shown in FIG. 4. In this embodiment, audio contents (audio data) to be delivered mean the items in FIG. 4.

The control point can obtain URL (links in which information is written) of the respective contents by acquiring the tree structure shown in FIG. 4 from the media server. When information on desired audio content (item) can be acquired, the control point can perform operation for an audio track (audio data) such as reproduction and stop of the audio content using a function called AV transport of the media server.

The DLNA server 1 and each of the DLNA clients 3 to 5 according to this embodiment come into, using the addressing function of the UPnP, a state in which communication with the TCP/IP can be performed as described above and perform device authentication each other using the discovery function of the UPnP. Consequently, the respective devices can grasp the structure of the network and perform communication with the target electronic device.

An example of a hardware configuration of the respective electronic devices constituting the content server system according to this embodiment is explained.

[Example of a Hardware Configuration of the DLNA Server]

Figure 5:
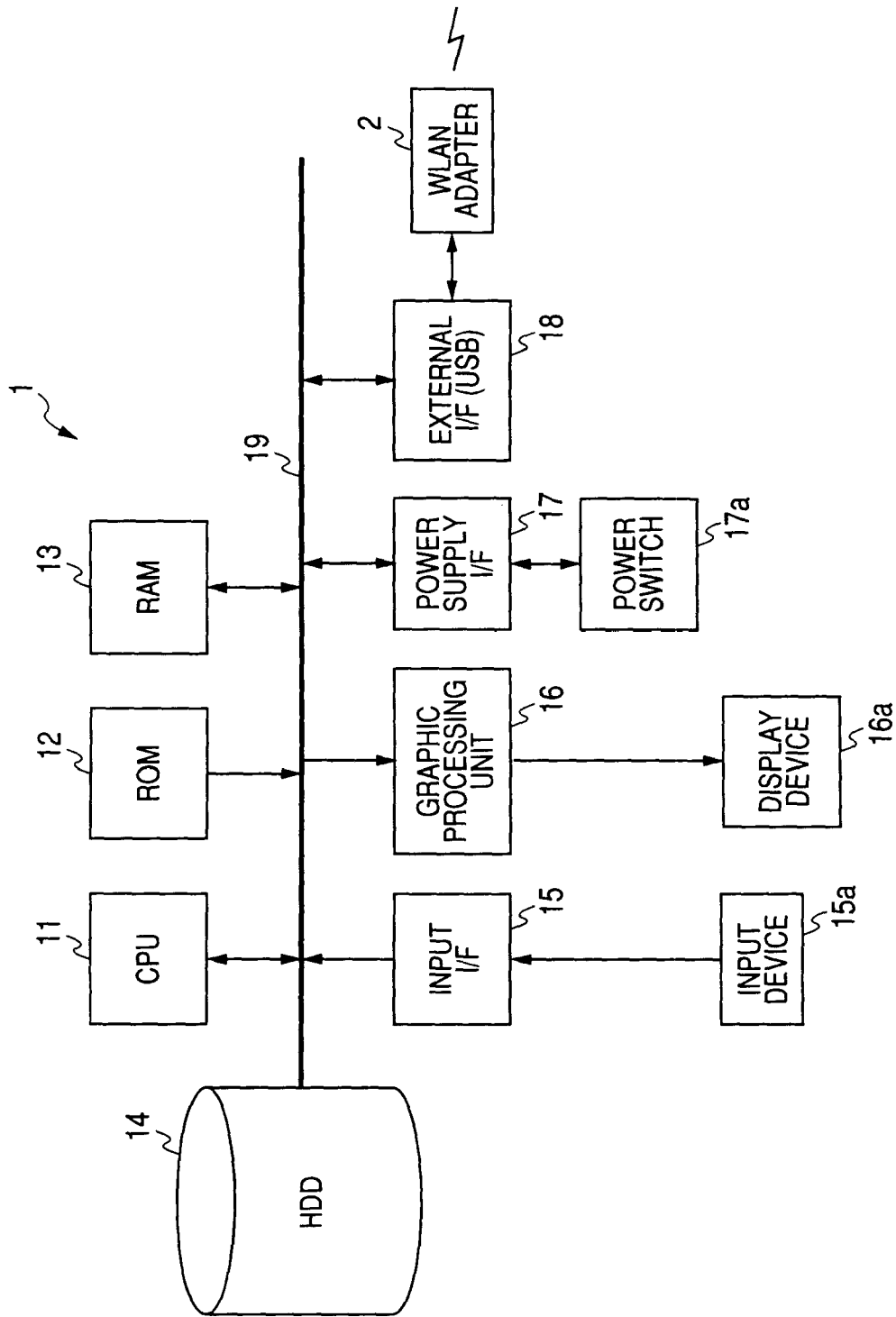
FIG. 5 is a block diagram showing a basic hardware configuration of a DLNA server.

FIG. 5 is a block diagram showing a basic hardware configuration of the DLNA server 1.

As shown in FIG. 5, the DLNA server 1 includes a CPU (Central Processing Unit) 11, a ROM (Read Only Memory) 12, a RAM (Random Access Memory) 13, an HDD 14, an input interface (I/F) 15, a graphic processing unit 16, a power supply interface (I/F) 17, and an external interface (I/F) 18. These units are connected to one another via an internal bus 19.

The CPU 11 manages control over the entire DLNA server 1. In the ROM 12, programs executed in the CPU 11, data necessary for processing, and the like are recorded. The RAM 13 is mainly used as a work area in various kinds of processing.

The HDD 14 has a capacity enough for storing a large number of digital contents (provided information) and the like. The HDD 14 stores various programs executed by the CPU 11, data for processing, and the like and is used as a work area, for example, when decoding of content is performed and the content is transmitted to the other devices through the wireless LAN adapter 2.

In this embodiment, in the HDD 14, a server program with which the DLNA server 1 functions as a server conforming to the DLNA guideline, which transmits audio data to the DLNA clients 3 to 5, is stored. The server program is executed by the CPU 11. Functions of the server program may include a transcode function for converting an encryption system, a sampling rate, a quantization rate, and the like of audio data stored in the HDD 14.

An input device 15*a* such as a keyboard or a mouse is connected to the input I/F 15. The input I/F 15 transmits a signal from the input device 15*a* to the CPU 11 via the internal bus 19.

A display device 16*a* such as an LCD (Liquid Crystal Display) is connected to the graphic processing unit 16. The graphic processing unit 16 causes the display device 16*a* to display an image on a screen thereof in accordance with a command from the CPU 11.

The power supply I/F 17 is an interface circuit for turning on and off the power supply for the DLNA server 1.

A power switch 17*a* is a switch for turning on and off the power supply for the DLNA server 1. When the power switch 17*a* is depressed in a state in which the power supply for the DLNA server 1 is off, a power ON command is supplied to the CPU 11 through the power supply I/F 17. Consequently, the power supply starts up.

The external I/F 18 is an interface circuit for transmitting and receiving data between the DLNA server 1 and an external device. In this embodiment, as an example, the external I/F 18 performs communication in accordance with the USB (Universal Serial Bus) standard. The wireless LAN adapter 2 is connected to the external I/F 18.

With the structure described above, the DLNA sever 1 is connected to an Ae network through the wireless LAN adapter 2. The DLNA server is capable of realizing the UPnP function and performing connection of the DLNA server 1 to the network and exchange of data through the network. Specifically, the DLNA server 1 is capable of receiving various data transmitted to the DLNA server 1 itself through the wireless LAN adapter 2 and recording the data in the HDD 14 and capable of reading out target data from the HDD 14 and the like according to a request for provision of content and the like from a partner device, sending the data to the Ae network through the wireless LAN adapter 2, and transmitting the data to the partner device.

[Example of the Structure of the Wireless LAN Adapter]

Figure 6:
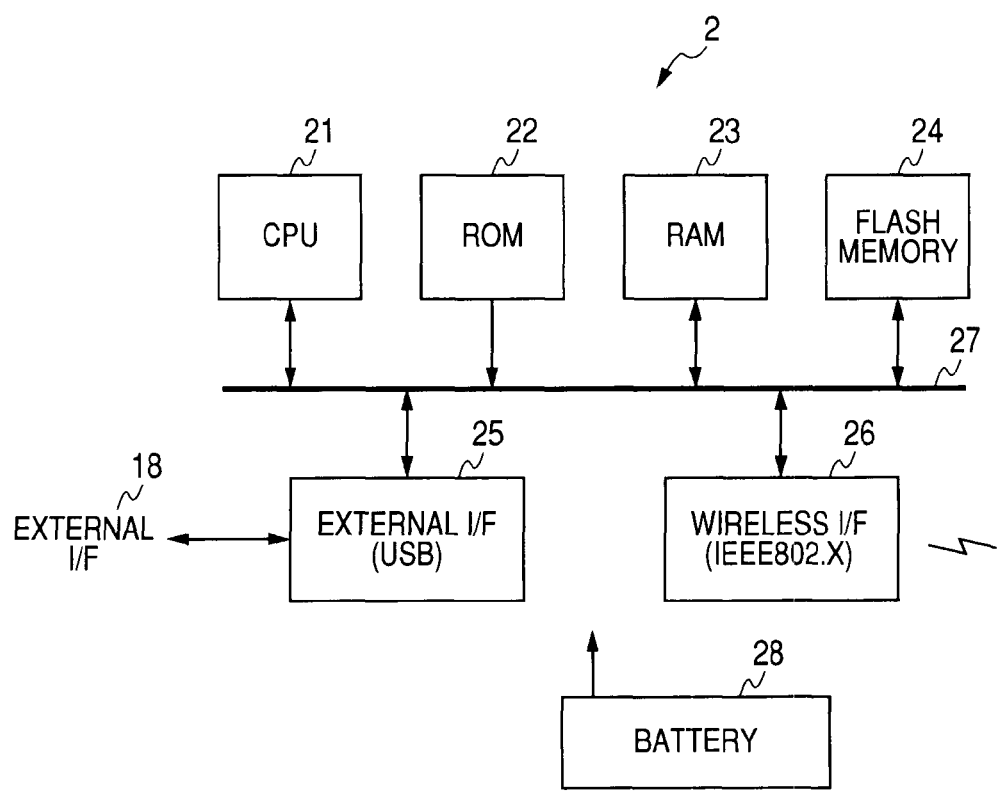
FIG. 6 is a block diagram showing a hardware configuration of a wireless LAN adapter.

FIG. 6 is a block diagram showing a hardware configuration of the wireless LAN adapter.

As shown in FIG. 6, the wireless LAN adapter 2 includes a CPU 21, a ROM 22, a RAM 23, a flash memory 24, an external interface (I/F) 25, and a wireless interface (I/f) 26. These devices are connected to one another via an internal bus 27. In the wireless LAN adapter 2, a battery 28 for driving the wireless LAN adapter 2, for example, while the power supply for the DLNA server 1 is off is provided.

The CPU 21 manages control over the entire wireless LAN adapter 2. In the ROM 22, programs executed in the CPU 21, data necessary for processing, and the like are recorded. The RAM 23 is mainly used as a work area in various kinds of processing. The CPU 21, the ROM 22, and the RAM 23 may be realized as a microcomputer. The flash memory 24 is a rewritable nonvolatile memory and stores, for example, information necessary for connection to the DLNA clients 3 to 5.

The external I/F 25 is a USB interface circuit for communicating with the external I/F 18 provided in an external device such as the DLNA server 1. The external I/F 25 includes a modulation and demodulation circuit for data transmitted and received via the external device.

The wireless I/F 26 is a wireless LAN interface circuit for communicating with external devices such as the DLNA clients 3 to 5 through a wireless LAN in an ad hoc mode. The wireless I/F 26 includes an antenna for transmitting and receiving a radio wave and a modulation and demodulation circuit for data to be transmitted and received.

In the external I/F 25 and the wireless I/F 26, communication procedures for performing communication in accordance with the USB standard and the IEEE 802.11x standard, respectively, are controlled by execution of a predetermined program by the CPU 21.

[Example of the Structure of the DLNA Client]

Figure 7:
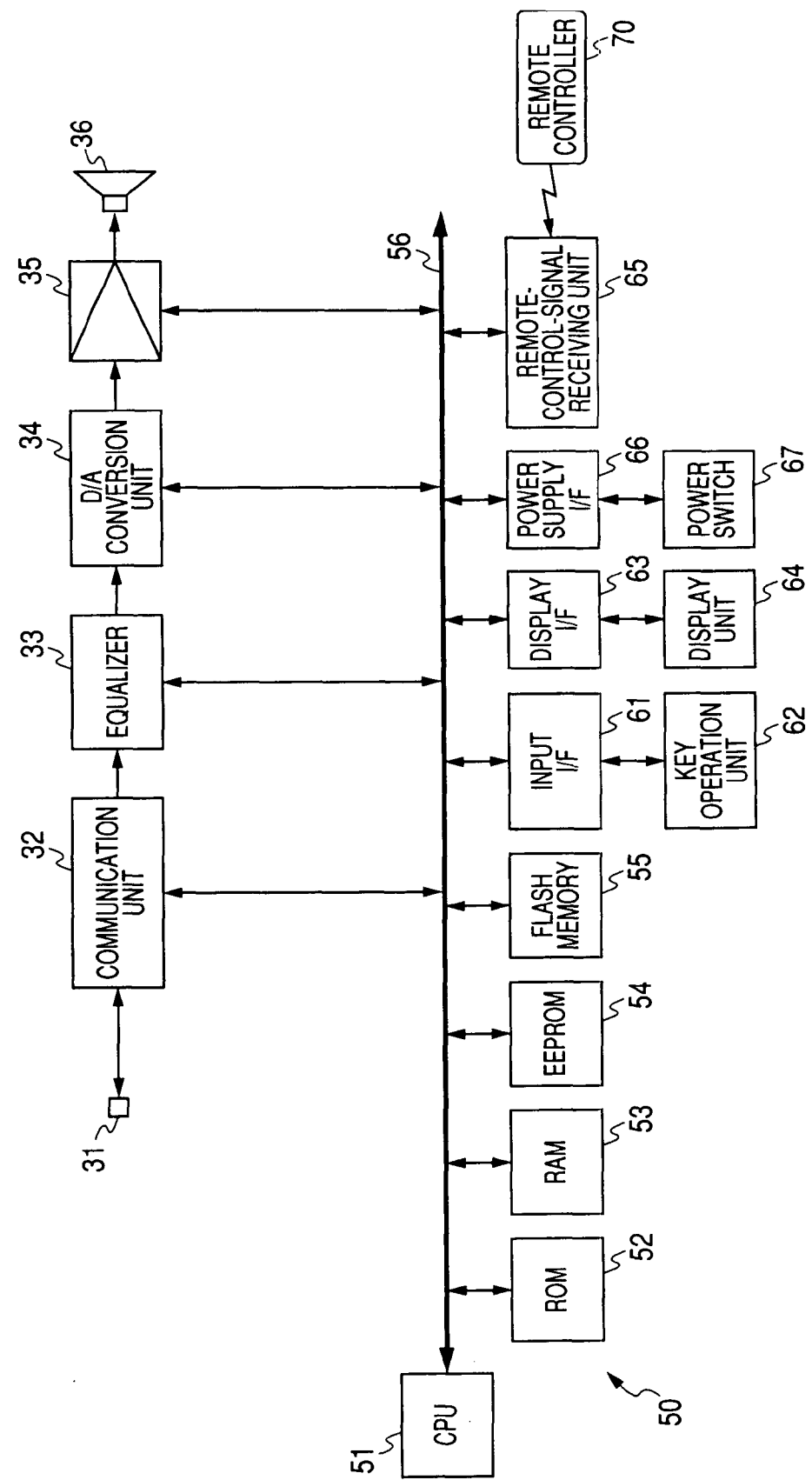
FIG. 7 is a block diagram showing a hardware configuration of the DLNA client.

FIG. 7 is a block diagram showing a hardware configuration of the DLNA client 3.

As shown in FIG. 7, the DLNA client 3 includes a communication terminal 31, a communication unit 32, an equalizer 33, a digital to analog (D/A) conversion unit 34, an audio amplifier 35, a speaker 36, a control unit 50, an input I/F 61, a key operation unit 62, a display I/F 63, a display unit 64, a remote-control-signal receiving unit 65, a power supply I/F 66, and a power switch 67.

The control unit 50 controls the respective units in the DLNA client 3. The control unit 50 is a microcomputer in which a CPU 51, a ROM 52, a RAM 53, an EEPROM 54, and a flash memory 55 are connected to one another via a CPU bus 56.

In the ROM 52, programs executed in the CPU 51, data necessary for processing, and the like are recorded. The RAM 53 is mainly used as a work area in various kinds of processing. The EEPROM 54 is a so-called nonvolatile memory and records various data that should be maintained even if a power supply for the DLNA client 3 is interrupted. The flash memory 55 is a rewritable nonvolatile memory and stores and maintains various setting parameters related to processing such as communication.

The communication unit 32, the equalizer 33, the D/A conversion unit 34, the audio amplifier 35, the input I/F 61, the display I/F 63, the remote-control-signal receiving unit 65, and the power supply I/F 66 are also connected to the CPU bus 56 and controlled by the CPU 51 via the CPU bus 56 to operate.

The communication unit 32 realizes, in the same manner as the DLNA server 1, the UPnP function and executes processing for performing connection of the DLNA client 3 to the network and transmission and reception of data through the network. The communication unit 32 converts, for example, data transmitted from the wireless LAN adapter 2 to the DLNA client 3 and received through the communication terminal 31 into data of a format that can be processed in the DLNA client 3. When the received data is audio data (digital audio data), the communication unit 32 supplies the data to the equalizer 33 at a post stage. When the received data is control data, the communication unit 32 supplies the data to the control unit 50. The communication unit 32 can also form, according to control by the control unit 50, a command and the like transmitted to a target electronic device, send the command and the like to the wireless LAN adapter 2, and transmits the command and the like to the partner device. The communication unit 32 also performs processing conforming to Ethernet such as carrier detection and collision detection.

The equalizer 33 applies sound quality adjustment to the audio data supplied from the communication unit 32 and outputs the audio data to the D/A conversion unit 34. Parameters of the sound quality adjustment are instructed to the equalizer 33 by the control unit 50 according to an instruction input from the user received through the key operation unit 62 and the input I/F 61.

The D/A conversion unit 34 converts the digital audio data supplied from the equalizer 33 into an analog audio signal and supplies the analog audio signal to the audio amplifier 35. The audio amplifier 35 amplifies the analog audio signal supplied from the D/A conversion unit 34 to a predetermined level and supplies the analog audio signal to the speaker 36. Consequently, sound corresponding to the supplied analog audio signal is reproduced and outputted from the speaker 36.

The respective functions of the equalizer 33 and the D/A conversion unit 34 can also be realized by software executed in the control unit 50.

The key operation unit 62 is connected to the control unit 50 via the input I/F 61. The key operation unit 62 includes various operation keys. The key operation unit 62 receives an operation input from the user, generates a control signal corresponding to the operation input, and supplies the control signal to the control unit 50 through the input I/F 61.

The display unit 64 is connected to the control unit 50 via the display I/F 63. The display unit 64 is formed by a display element such as an LCD or an organic EL (Electro-Luminescence) display. The display unit 64 displays various kinds of display information such as a guidance message (all songs, album play, etc.), an error message, and state display according to a display signal from the display I/F 63.

The remote-control-signal receiving unit 65 receives, for example, an infrared signal from a remote controller 70 on the outside, converts the infrared signal into an electric signal, and supplies the electric signal to the control unit 50. The remote controller 70 includes various operation keys. The remote controller 70 receives an operation input from the user, forms a signal corresponding to the operation input, and sends the signal.

The power supply I/F 66 is an interface circuit for turning on and off the power supply for the DLNA client 3.

The power switch 67 has a function same as that of the power switch 17a.

The DLNA clients 4 and 5 are realized by the structure same as that of the DLNA client 3 described above. Thus, explanation of the DLNA clients 4 and 5 is omitted.

An example of a software configuration of the respective electronic devices constituting the content server system according to this embodiment is explained below.

[Software Configuration of the DLNA Server 1]

Figure 8:
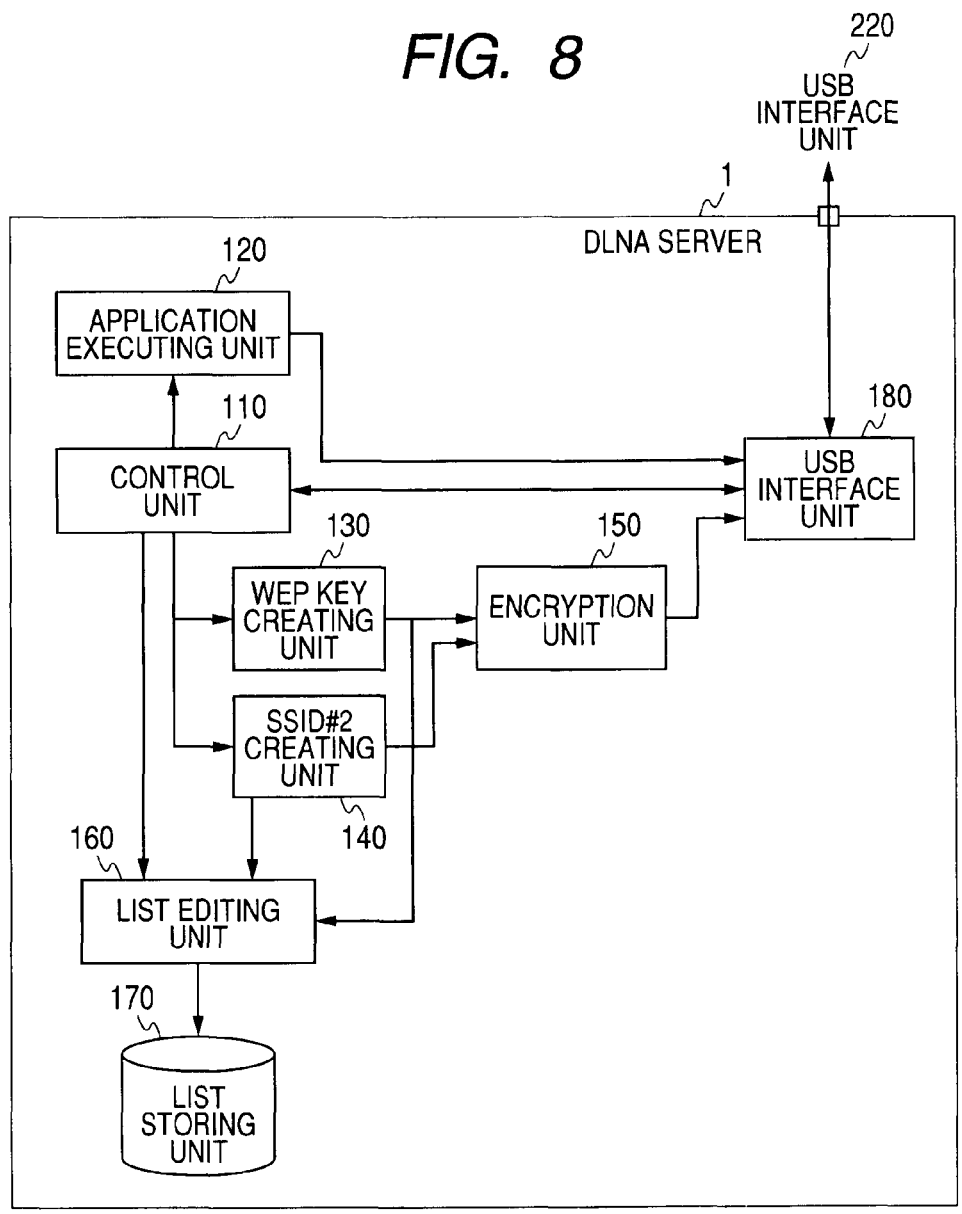
FIG. 8 is a block diagram showing a basic software configuration of the DLNA server.

FIG. 8 is a block diagram showing a basic software configuration of the DLNA server 1.

The DLNA server 1 includes a control unit 110, an application executing unit 120, a WEP key creating unit 130, an SSID#2 creating unit 140, an encryption unit 150, a list editing unit 160, a list storing unit 170, and a USB interface unit 180.

The control unit 110 manages the entire DLNA server 1. For example, the control unit 110 passes necessary data to the respective units in the DLNA server 1 and passes data received from the respective units to the USB interface unit 180.

The application executing unit 120 executes an application necessary for Ae network connection. This application is installed in the DLNA server 1, for example, when the wireless LAN adapter 2 is connected to the DLNA server 1 for the first time. After the connection to the Ae network is established, the application executing unit 120 supplies a music file, a video file, and the like to a DLNA client connected to the Ae network.

The WEP key creating unit 130 creates a 128-bit (random) WEP key for the Ae network according to an instruction by the control unit 110.

The SSID#2 creating unit 140 creates an SSID#2 according to an instruction of the control unit 110 and passes the SSID#2 to the encryption unit 150 and the list editing unit 160.

The SSID#2 is an SSID for designating the Ae network. The SSID#2 is formed by attaching a 12-character (48-bit) random number after a prefix "Wireless Adapter".

The encryption unit 150 has a public key and encrypts the WEP key using this public key. The public key is, for example, a public key with 1024 bits and an RSA-OAEP (RSA public key cryptosystem with Optimal Asymmetric Encryption Padding) public modulus (128 bytes) of 65537.

The list editing unit 160 edits MAC addresses and device names for uniquely identifying the DLNA clients 3 to 5 received from the DLNA clients in the Ae network into a list together with SSIDs and WEP keys used in the Ae network.

The list (a client list) created by the list editing unit 160 is stored in the list storing unit 170. This client list is a registration list of the UPnP.

FIG. 9 is a diagram showing the client list.

In a client list 171, spaces of an Ap network SSID, an Ae network SSID, a MAC address, a device name, and a WEP key are provided. Pieces of information arranged in the horizontal direction of the respective spaces are associated with one another.

In the space of the Ap network SSID, an SSID used in an Ap network (ADHOC plain network) is set. Specifically, an SSID stored in a SSID#1 storing unit described later of each of the DLNA clients is set. The Ap network is described later.

In the space of the Ae network SSID, an SSID used in an Ae network is set. DLNA clients whose SSIDs are set in this space can be connected to an identical Ae network.

In the space of the MAC address, a received MAC address is set. In the space of the device name, a received device name is set. This device name can be used, for example, when the user identifies a type of a DLNA client.

In the space of the WEP key, a WEP key for each of SSIDs of the Ae network (in FIG. 9, a WEP#2 for an SSID#2 and a WEP#3 for an SSID#3) is set.

Referring back to FIG. 8, the USB interface unit 180 constitutes an interface with the wireless LAN adapter 2.

[Software Configuration of the Wireless LAN Adapter 2]

Figure 10:
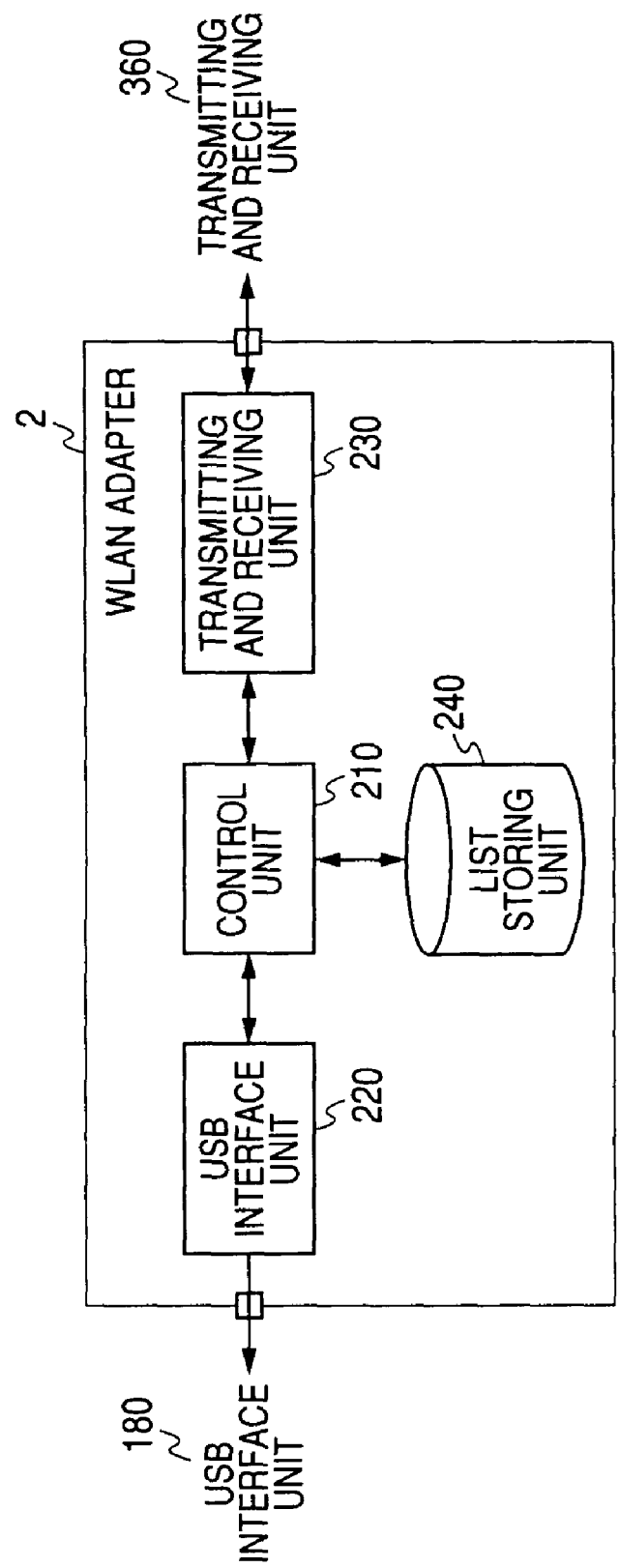
FIG. 10 is a block diagram showing a basic software configuration of the wireless LAN adapter.

FIG. 10 is a block diagram showing a basic software configuration of the wireless LAN adapter 2.

The wireless LAN adapter 2 includes a control unit 210, a USB interface unit 220, a transmitting and receiving unit 230, and a list storing unit 240.

The control unit 210 manages the entire wireless LAN adapter 2.

The USB interface unit 220 constitutes an interface with the DLNA server 1.

The transmitting and receiving unit 230 transmits data to and receives data from the DLNA client 3.

In the list storing unit 240, a list including contents same as those of the client list 171 is stored.

[Software Configuration of the DLNA Client 3]

Figure 11:
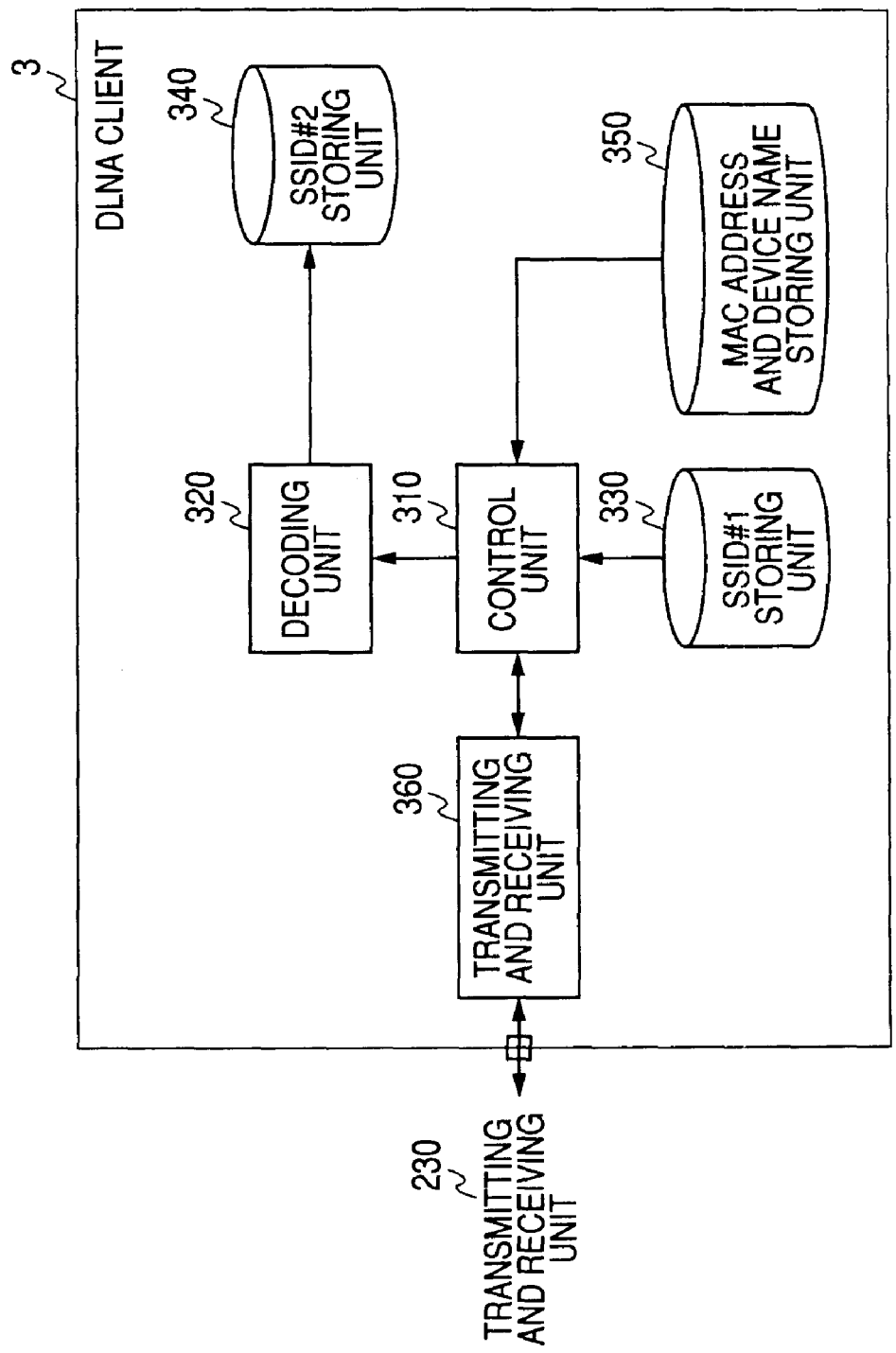
FIG. 11 is a block diagram showing a basic software configuration of the DLNA client.

FIG. 11 is a block diagram showing a basic software configuration of the DLNA client 3.

The DLNA client 3 includes a control unit 310, a decoding unit 320, an SSID#1 storing unit 330, an SSID#2 storing unit 340, a MAC address and device name storing unit 350, and a transmitting and receiving unit 360.

The control unit 310 controls the entire DLNA client 3.

The decoding unit 320 has a secret key corresponding to the public key and prepared in advance. When the decoding unit 320 receives an encryption key from the control unit 310, the decoding unit 320 decodes an SSID#2 from the encryption key using the secret key and stores the SSID#2 in the SSID#2 storing unit 340.

The SSID#1 storing unit 330 stores an SSID#1. The SSID#1 is an SSID used in an Ap network. The SSID#1 is formed by attaching a 12-character MAC address of the DLNA client 3 after a prefix "WirelessDA".

The SSID#2 storing unit 340 stores the SSID#2 decoded by the decoding unit 320.

The MAC address and device name storing unit 350 stores a MAC address and a device name of the DLNA client 3 in association with each other.

The transmitting and receiving unit 360 transmits data to and receives data from the wireless LAN adapter 2.

Operations of the content server system are explained in detail below.

First, when the power supply for the DLNA server 1 is turned on and the control unit 110 starts up, the control unit 110 instructs the application executing unit 120 to execute an application. The application executing unit 120 transmits an upload command to a DLNA client registered in the client list 171.

On the other hand, the application executing unit 120 scans an SSID=SSID#1 in order to join an Ap network with the SSID=SSID#1 to find a DLNA client unregistered in the client list 171.

The Ap network is a network mainly used for exchange of a WEP key in an initial setting step. The DLNA clients 3 to 5 start the network and the DLNA server 1 joins the network.

The control unit 110 sends a response content in which a DLNA client that is registered and from which a command response to the upload command is received is indicated as "Connect" and a DLNA client that is registered and does not respond to the upload command is indicated as "Disconnect" to the application executing unit 120. The control unit 110 sends, in response to the scan of the SSID#1, response content in which a DLNA client that is unregistered and responds to the upload command is indicated as "New" to the application executing unit 120. The judgment on whether a DLNA client is unregistered can be performed by referring to the space of the Ap network SSID of the client list 171.

The application executing unit 120 applies connection processing to the DLNA client indicated as "Connect" in the response content. The processing described in the section [overview of UPnP] is used as this processing.

On the other hand, the application executing unit 120 performs Ae network connection processing in order to establish Ae network connection to the DLNA client indicated as "New" in the response content. As this processing, there are initial connection processing executed in a state in which the DLNA server 1 is on and in a state in which the power supplies for the DLNA clients 3 to 5 unregistered in the client list 171 are on and reconnection processing executed in a state in which the DLNA server 1 is off and in a state in which the power supplies for the DLNA clients 3 to 5 registered in the client list 171 are on. Processing contents of these kinds of processing are different. These kinds of processing performed when the DLNA client 3 is "New" is explained below as an example.

[Initial Connection Processing]

Figure 12:
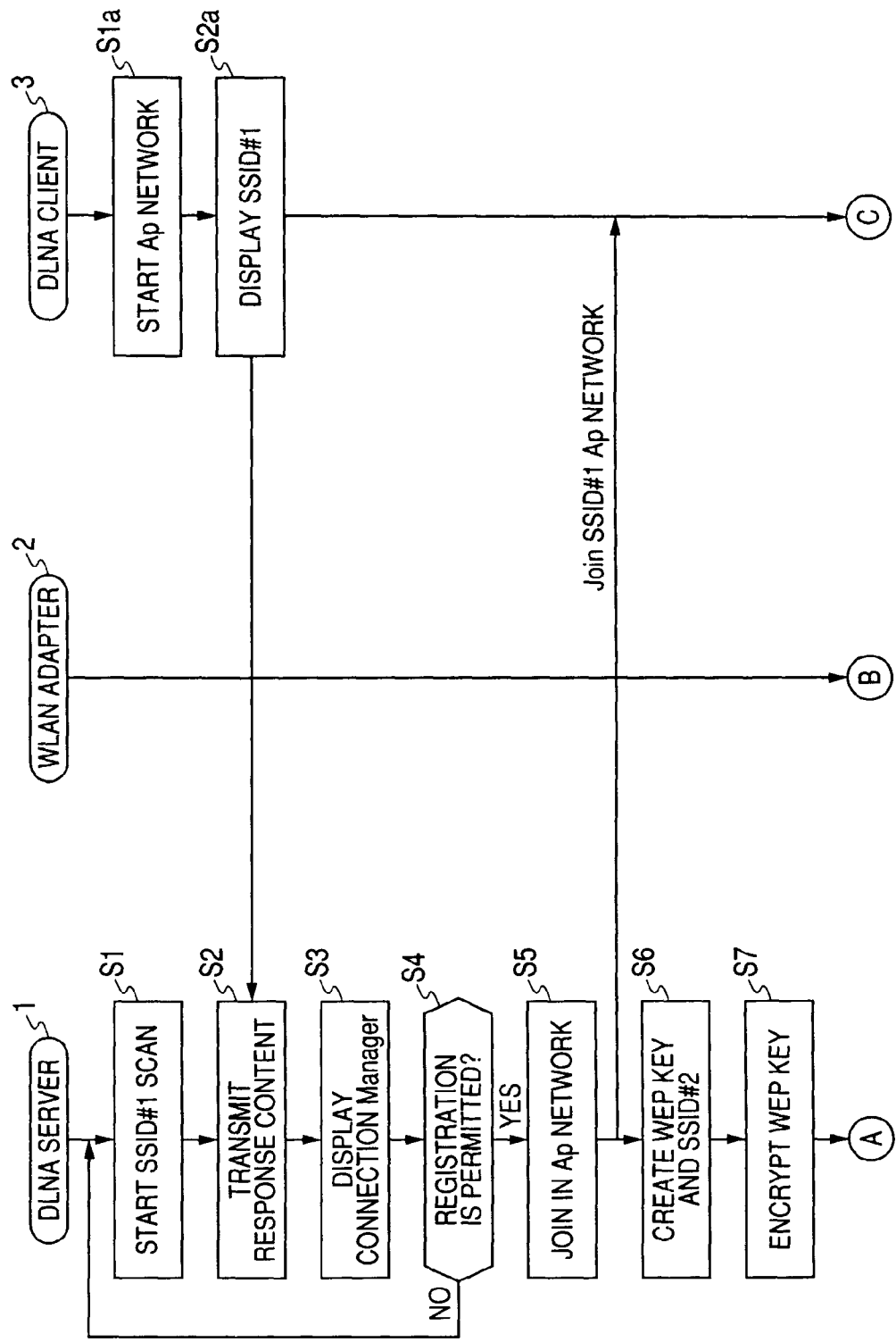
FIG. 12 is a flowchart showing initial connection processing.
Figure 13:
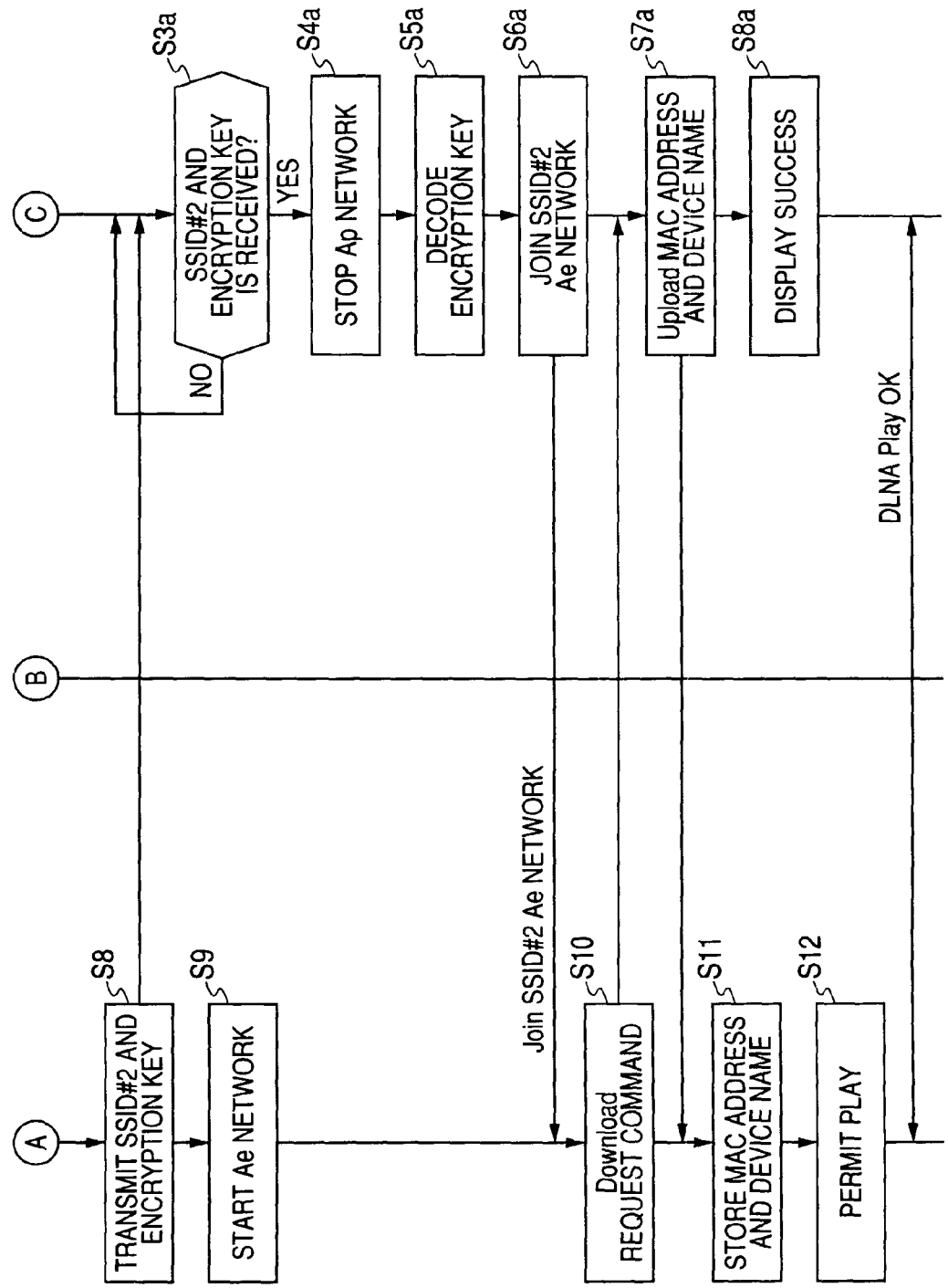
FIG. 13 is a flowchart showing the initial connection processing.

FIGS. 12 and 13 are flowcharts showing the initial connection processing. The initial connection processing has an initial setting step and a connection establishing step. These steps are explained in order below.

[Initial Setting Step]

First, when the power supply for the DLNA server 1 is turned on and the control unit 110 starts up, the control unit 110 instructs the application executing unit 120 to execute an application.

The application executing unit 120 scans an SSID#1 in order to join an Ap network with an SSID=SSID#1 (to find an unregistered DLNA client) (step S1).

Specifically, the application executing unit 120 stands by for a response of an SSID including the SSID#1 ("SSID#1="WirelessDA****"" (* is an arbitrary value) including an identifier "WirelessDA" decided in advance.

On the other hand, when the power supply for the DLNA client 3 is turned on, the control unit 310 extracts the SSID#1 stored in the SSID#1 storing unit 330. The control unit 310 starts an Ap network with an SSID=SSID#1 ("SSID#1="WirelessDA_xxxx"" (xxxx is a MAC address) (step S1a) and displays the SSID#1 on the display unit 64 (step S2a).

The control unit 110 sends response content in which the DLNA client 3 is indicated as "New" to the application executing unit 120 (step S2).

When the application executing unit 120 receives the response content, the application executing unit 120 judges whether "New" is included in the response content. When "New" is not included in the response content, the application executing unit 120 finishes the initial connection processing. On the other hand, when "New" is included in the response content, the application executing unit 120 displays a connection Manager (a connection management screen) on the display device 16a (step S3).

The application executing unit 120 stands by for a registration permission (step S4).

Figures 14, 15:
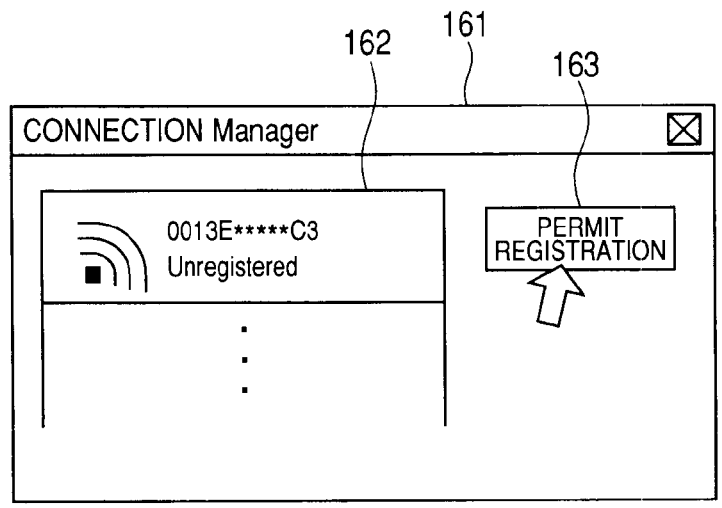
FIG. 14 is a diagram showing a connection Manager.
FIG. 15 is a diagram showing DOWNLOAD_SSID_WEPKEY commands.

FIG. 14 is a diagram showing a connection Manager 161.

The connection Manager 161 has an SSID display section 162 and a registration permission button 163.

In the SSID display section 162, an SSID#1 of an unregistered DLNA client that responds to the application executing unit 120 (in this embodiment, an SSID#1 of the DLNA client 3) is displayed.

When the user selects, from the SSID display section 162, (an SSID) of a DLNA client, which the user desires to register, and depresses the registration permission button 163, the application executing unit 120 judges that the registration is permitted (Yes in step S4). When the DLNA client is connected to another Ae network, the application executing unit 120 disconnect the DLNA client and joins the Ap network with the SSID=SSID#1 started by the DLNA client 3 (step S5).

When the user selects none of SSIDs displayed on the SSID display section 162 (No in step S4), the application executing unit 120 returns to step S1.

The control unit 110 gives a creation instruction to the WEP key creating unit 130 and the SSID#2 creating unit 140. According to the creation instruction, the WEP key creating unit 130 creates a WEP key and the SSID#2 creating unit 140 creates an SSID#2 (step S6). The WEP key creating unit 130 passes the created WEP key to the encryption unit 150 and the list editing unit 160. The SSID#2 creating unit 140 passes the created SSID#2 to the encryption unit 150 and the list editing unit 160. The list editing unit 160 stores the received WEP key and SSID#2 in the list storing unit 170 in association with each other.

Although not shown in the figure, the WEP key creating unit 130 refers to the space of the Ap network SSID of the client list 171. When there is a DLNA client with an SSID=SSID#1, the WEP key creating unit 130 extracts a WEP key set in the space of the WEP key of the DLNA client from the client list 171 and uses the WEP key. In this case, the DLNA client 3 belongs to an Ae network identical with that of the DLNA client already registered.

The encryption unit 150 encrypts the created WEP key with the public key (step S7). The encryption unit 150 creates an IP address for each of the DLNA clients and registers the IP address in the client list 171. The encryption unit 150 sets a Port number used in an upload command. The encryption unit 150 downloads (transmits) the SSID#2 and the encryption key to the DLNA client 3 using the registered IP address and the set Port number according to a DOWNLOAD_SSID_WEPKEY command (step S8 in FIG. 13).

FIG. 15 is a diagram showing the DOWNLOAD_SSID_WEPKEY command.

The DOWNLOAD_SSID_WEPKEY command is a command with a total length of (40+k+s bytes).

The number of bytes is set in a space of byte offset. Content of each of byte offsets is set in a space of contents.

The control unit 110 cuts connection to the Ap network and starts an Ae network with an SSID=SSID#2 and a Key=WEP key.

On the other hand, the DLNA client 3 stands by for reception of the SSID#2 and the encryption key (step S3a). When the SSID#2 and the encryption key are received (Yes in step S3a), the DLNA client 3 stops the Ap network (step S4a).

Thereafter, the DLNA client 3 decodes the encryption key and extracts the WEP key and the SSID#2 (step S5a).

The control unit 310 joins the Ae network with the SSID=SSID#2 (step S6a). In joining the Ae network, the control unit 310 uses an IP address, a sub-net mask, and the like downloaded from the DLNA server 1 in step S8.

Thereafter, the control unit 110 and the control unit 310 transmit and receive data using the IP address and the port number set according to the download command.

When the DLNA client 3 joins the Ae network, a connection establishing step is performed.

[Connection Establishing Step]

The control unit 110 downloads a request command to the DLNA client 3 (step S10).

When the control unit 310 receives the request command, the control unit 310 uploads a MAC address and a device name as a response to the success of Ae network connection (step S7a).

The control unit 310 displays, on the display unit 64, an indication that the Ae network connection is successful (step S8a).

On the other hand, when the control unit 110 receives the MAC address and the device name, the control unit 110 passes the MAC address and the device name to the list editing unit 160. The list editing unit 160 stores the received MAC address and device name in the client list 171 in association with the SSID and the WEP key received in step S6 (step S11). Consequently, the DLNA client 3 is registered in the client list 171. For example, at this timing, a list same as the client list 171 is stored in the list storing unit 240 of the wireless LAN adapter 2.

The control unit 110 permits the application executing unit 120 to perform DLNA play (step S12). Consequently, the DLNA client 3 can acquire content data from the DLNA server 1 through the Ae network (can perform DLNA audio reproduction).

The connection processing is finished here.

The control unit 110 performs time-out check in a period from the joining in the Ap network after step S4 and the permission of the play in step S12. When an error occurs or when time until the permission of the play is equal to or longer than predetermined seconds (e.g., 60 seconds), the control unit 110 instructs the application executing unit 120 to display an error screen on the display unit 64 and returns to step S1.

[Reconnection Processing]

Figure 16:
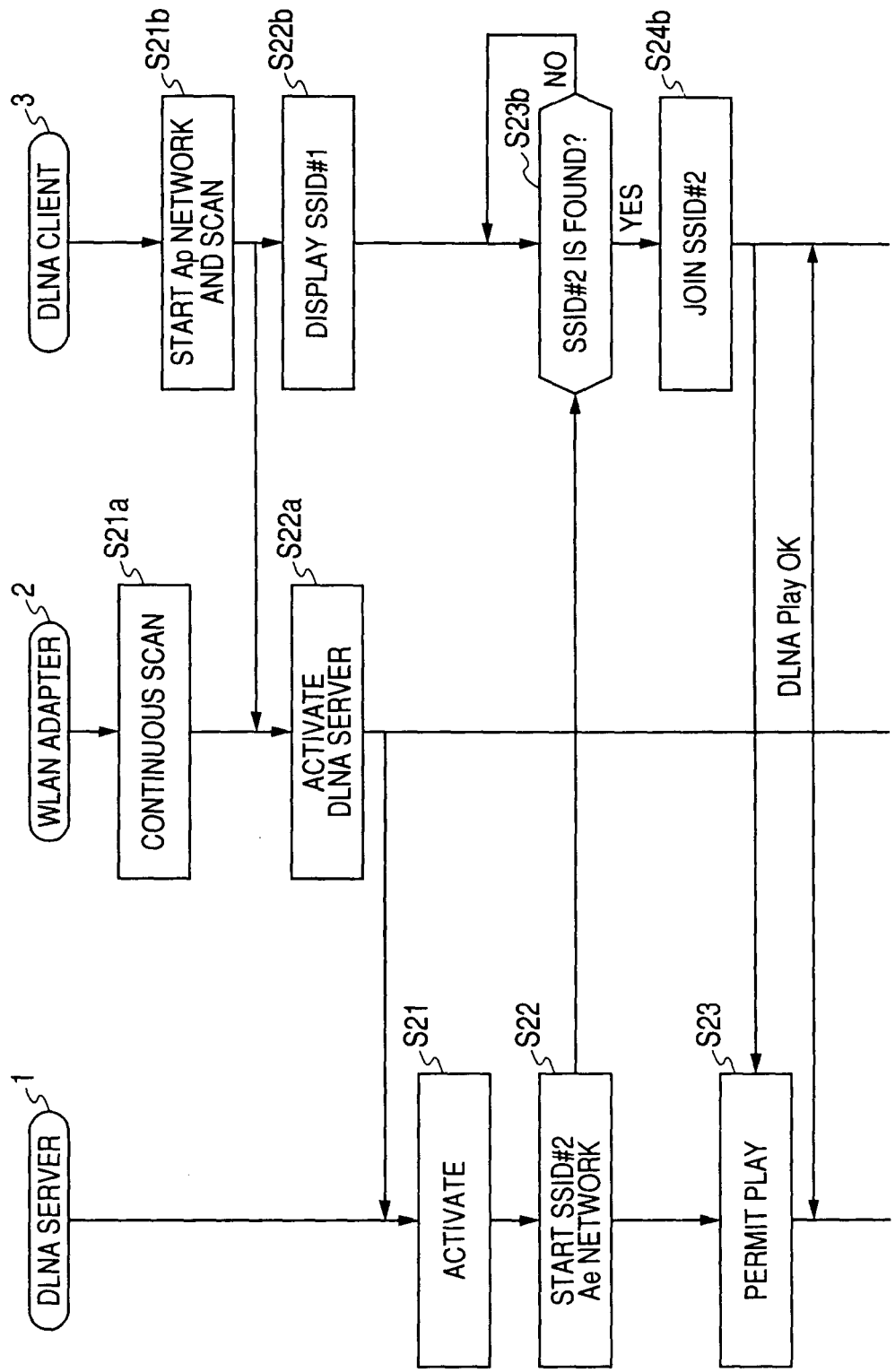
FIG. 16 is a flowchart showing reconnection processing.

FIG. 16 is a flowchart showing the reconnection processing.

Even when the power supply for the DLNA server 1 is off, the control unit 210 receives the supply of electric power from the battery 28 and performs continuous scan of an SSID=SSID#1 (step S21a) and judges whether the DLNA client 3 (a DLNA client registered in the client list of the list storing unit 240) is present.

Here, when the power supply for the DLNA client 3 is turned on, the control unit 310 starts an Ap network with the SSID=SSID#1 and starts continuous scan of an SSID=SSID#2 (step S21b) and displays the SSID#1 on the display unit 64 (step S22b).

When the control unit 210 finds an SSID (in this explanation, the SSID#1) coinciding with the SSID set in the space of the Ap network of the client list stored in the list storing unit 240, the control unit 210 activates the DLNA server 1 (step S22a).

Consequently, the control unit 110 is activated (step S21) and starts an Ae network with the SSID=SSID#2 and a Key=WEP key (step S22).

On the other hand, after displaying the SSID#1 on the display unit 64, the control unit 310 searches for the SSID=SSID#2 stored in the SSID#2 storing unit 340 (No in step S23b). When the control unit 310 finds the Ae network with the SSID=SSID#2 (Yes in step S23b), the control unit 310 joins the Ae network (step S24b).

The control unit 110 permits the application executing unit 120 to perform DLNA play in response to the joining of the DLNA client 3 in the Ae network (step S23). Consequently, the DLNA client 3 can acquire content data from the DLNA server 1 through the Ae network.

As described above, the content server system according to this embodiment starts up the connection Manager 161 in the initial setting step, causes the user to judge propriety of connection of DLNA clients, and transmits the encryption key and the SSID#2 only to a DLNA client selected by the user. Therefore, it is possible to easily and surely exclude DLNA connection by a malicious third party and establish a highly reliable system.

An operation performed by the user in the initial connection processing only has to be the judgment of propriety of connection. Therefore, it is possible to easily establish DLNA connection.

A MAC address and a device name of a DLNA client received in the connection establishing step are registered in the client list 171. Therefore, after the initial connection processing is performed, this DLNA client is registered. When the DLNA client makes connection next time, it is possible to simplify connection processing by indicating the DLNA client as "Connect".

The wireless LAN adapter 2 performs scan of the SSID#2 even in a state in which the DLNA server 1 is off. Thus, when anyone of registered DLNA clients is reactivated, the processing in step S21 and the subsequent steps of the reconnection processing is performed and the DLNA server 1 and the DLNA client automatically perform DLNA connection. Therefore, it is possible to simplify connection processing.

During initial setting, when a client whose MAC address is not set in the client list joins an Ae network, a pop-up may be displayed to cause the user to judge propriety of connection. Consequently, it is possible to further improve safety.

A content server system according to a second embodiment of the present invention is explained.

Differences between the content server system according to the second embodiment and the content server system according to the first embodiment are mainly explained below. Explanation of similarities of the content server systems is omitted.

The content server system according to the second embodiment is different from the content server system according to the first embodiment in that a part of the functions of the DLNA server 1 is imparted to the wireless LAN adapter 2.

Figure 17:
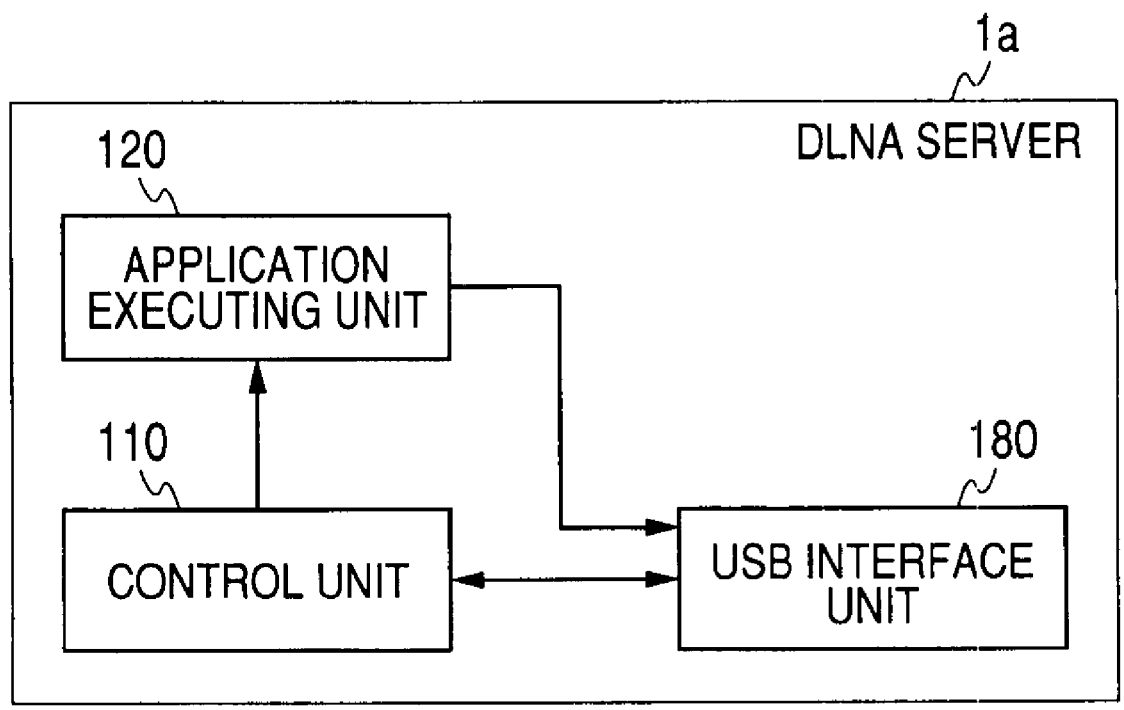
FIG. 17 is a block diagram showing a software configuration of a DLNA server according to a second embodiment of the present invention.

FIG. 17 is a block diagram showing a software configuration of a DLNA server according to the second embodiment.

A DLNA server 1a includes the control unit 110, the application executing unit 120, and the USB interface unit 180.

Figure 18:
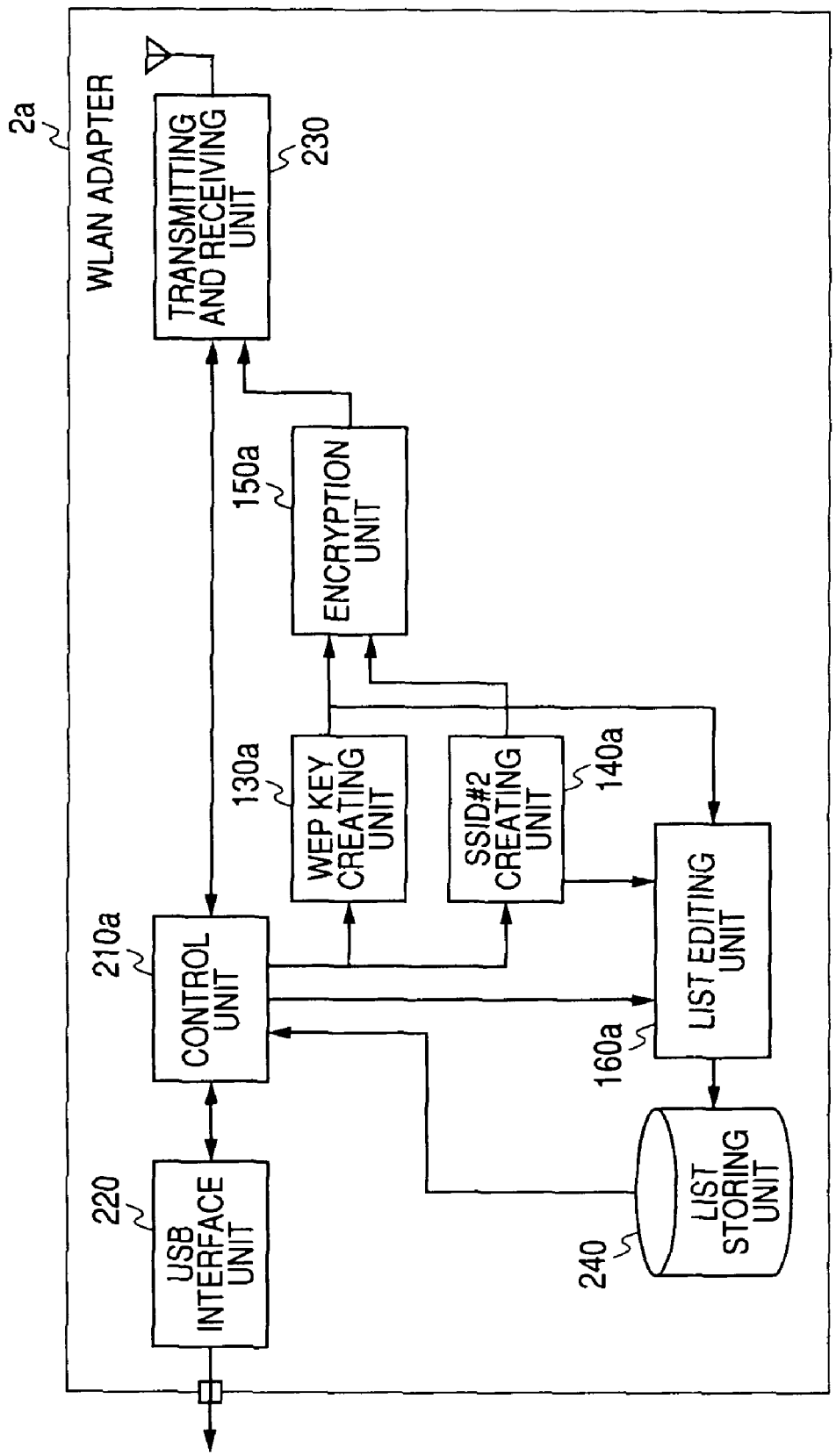
FIG. 18 is a block diagram showing a software configuration of a wireless LAN adapter according to the second embodiment.

FIG. 18 is a block diagram showing a software configuration of a wireless LAN adapter according to the second embodiment.

A wireless LAN adapter 2a further includes, in addition to the respective units of the wireless LAN adapter 2, a WEP key creating unit 130a, an SSID#2 creating unit 140a, an encryption unit 150a, and a list editing unit 160a. A control unit 210a further has a part of the functions of the control unit 110 in addition to the functions of the control unit 210. Since functions of the respective units are the same as those of the content server system according to the first embodiment, explanation of the functions is omitted.

Initial connection processing according to the second embodiment is explained below.

FIGS. 19 and 20 are flowcharts showing the initial connection processing according to the second embodiment.

Steps of respective kinds of processing same as those in the first embodiment are denoted by the same step numbers.

As shown in FIG. 19, in the initial connection processing according to the second embodiment, processing is mainly performed between the wireless LAN adapter 2a and the DLNA client 3. Activation of the connection Manger 161 and transmission of a registration permission by depression of the registration permission button 163 are performed in the DLNA server 1a.

Processing until play permission is performed between the wireless LAN adapter 2a and the DLNA client 3.

[Reconnection Processing]

FIG. 21 is a flowchart showing reconnection processing according to the second embodiment.

The reconnection processing according to the second embodiment is different from the reconnection processing according to the first embodiment in that, after activation of the control unit 110 of the DLNA server 1, the control unit 210a starts an Ae network with an SSID=SSiD#2 and a Key=WEP key (step S23a) and that the control unit 210a permits the control unit 110 to perform DLNA play in response to joining of the DLNA client 3 in the Ae network (step S24a).

In the content server system according to the second embodiment, effects same as those of the content server system according to the first embodiment are obtained.

In the content server system according to the second embodiment, it is possible to realize reconnection quicker than that in the content server system according to the first embodiment.

For example, when a PC as a server is a PC that a user uses for normal application processing as well, it is assumed that the PC is placed in a state of power saving by a sleep mode or the like when the user does not use the PC. In general, a method of use for completely turning off the power supply for the PC and a method of use for resetting the PC to a state during the last use in a short time with simple operation are conceivable. However, when the PC is used as a server, it is necessary to place the PC in a state of the latter method. This state is called a sleep mode, a suspend mode, and the like.

The PC placed in the mode for resetting the PC with simple operation in this way is reset from the power saving state and performs a service of the server according to a request from a DLNA client. However, when processing up to authentication of a DLNA client is performed in a wireless LAN adapter, the PC can be adapted to be reset only when a request is received from a regular DLNA client. Not all DLNA clients that can be connected to a DLNA network are permitted to be connected to the PC serving as a DLNA server. Therefore, not only connection requests from DLNA clients regularly permitted to be connected reach the DLNA server including the wireless LAN adapter.

When the DLNA server is constituted as in this embodiment, since a request from a client not normally permitted to be connected is rejected in the wireless LAN adapter, the PC as the server is not activated from the power saving state. Consequently, the PC is not activated at timing not desired by a user of the PC and the user can confirm that the PC operates only when necessary.

Moreover, when the user of the PC and a user of a DLNA client are identical, for example, a DLNA server function does not start up on the basis of a request from a non-regular client during use of the PC. Therefore, the user less often feels uneasy that failure occurs.

The network systems, the network connecting devices, and the network connecting methods according to the embodiments of the present invention have been explained with reference to the drawings. However, the present invention is not limited to the network systems, the network connecting devices, and the network connecting methods. The respective components explained in the embodiments can be replaced with arbitrary components having the same functions. Other arbitrary components and steps may be added to the present invention.

Software configurations of a DLNA server and a wireless LAN adapter are not limited to those explained above. For example, only the encryption function of the DLNA server 1 may be imparted to the wireless LAN adapter.

The processing functions of the DLNA server 1, the wireless LAN adapter 2, and the DLNA clients 3 to 5 explained in the embodiments can be realized by a computer. In that case, a program describing processing contents of the functions that the DLNA server 1, the wireless LAN adapter 2, and the DLNA clients 3 to 5 should have is provided. When the program is executed by the computer, the processing functions are realized on the computer. The program describing the processing contents can be recorded in a computer-readable recording medium. As such a recording medium, there are a magnetic recording device, an optical disk, a magneto-optical recording medium, a semiconductor memory, and the like.

When the program is circulated, for example, the program is recorded in a portable recording medium including a semiconductor memory and the portable recording medium is sold. It is also possible to store the program in a storage of a server computer and transfer the program from the server computer to other computers through a network.

A computer that executes the program stores, for example, the program recorded in the portable recording medium or the program transferred from the server computer in a storage of the computer itself. The computer reads the program from its own storage and executes processing that complies with the program. The computer can also directly read the program from the portable recording medium and executes processing that complies with to the program.

In the explanation of the embodiments, the DLNA server has only the function of the media server. However, the DLNA server further has a function of a media renderer. In this case, it is possible to include a DLNA server as a device that is switched to a reproducing device and to which the reproducing device is switched.

As contents delivered from the media server and reproduced by the media renderer, besides audio content, it is possible to apply video content, still image content, and text content such as news.

In the explanation of the embodiments, the present invention is applied to the content server system employing the UPnP. However, besides, it is possible to apply the present invention to, for example, network systems to which various specifications such as Jini (Java (registered trademark) intelligent network infrastructure) and HAVi (Home Audio/Video interoperability) are applied. In other words, it is possible to apply the present invention to various network systems in which server devices that provide various contents such as audio content and client devices that receive the provided contents and sequentially reproduce the contents are present.

It should be understood by those skilled in the art that various modifications, combinations, sub-combinations, and alterations may occur depending on design requirements and other factors insofar as they are within the scope of the appended claims or the equivalents thereof.

What is claimed is:

1. A network system that performs network connection between devices conforming to a predetermined communication standard, the network system comprising:
a plurality of client devices in a first network, each client device including:
a first network starting unit to start the first network and present first identification information including a predetermined identifier associated with the first network and a prefix that is the same for each client device included in the plurality of client devices in the network; and
a server including:
a scanning unit to scan for the prefix of the first identification information,
a reading unit to read the first identification information located by the scanning unit and including the prefix,
an option presenting unit to present to a user, as an option of joining the first network, a client device from the plurality of client devices including the first identification information read by the reading unit,
a first network joining unit to join the first network upon selection of the option, and
a transmitting unit to transmit, to the selected client device upon joining the first network, a communication encryption key for joining a second network and second identification information designating the second network.

2. A network system according to claim 1, wherein,
the first identification information is information different for each client device of the plurality of client devices,
the server further includes an identification-information storing unit to store the first identification information read by the reading unit,
the reading unit judges, when the first identification information is received, whether the received first identification information coincides with the first identification information stored in the identification-information storing unit, and
the option presenting unit presents, as an option of a network connection destination, the client device including the first identification information not coinciding with the first identification information stored in the identification-information storing unit.

3. A network system according to claim 1, wherein,
the server includes:
a second network starting unit that starts the second network after the second identification information is transmitted; and
a connection permitting unit that permits network connection to the client device when information specific to the client device is received after the second network is started, and
the client device includes:
a decoding unit to decode the communication encryption key with a predetermined decoding key; and
a second network joining unit to join the second network using information obtained by decoding the communication encryption key with the decoding key and transmit the information specific to the client device to the server, wherein
the first network starting unit disconnects from the first network upon reception of the communication encryption key and the second identification information.

4. A network system according to claim 3, further comprising:
- a network connecting device connected at the server and including a second reading unit to read the first identification information; and
- a server activating unit to activate the server when the second reading unit reads the first identification information in a state in which the server is not activated, wherein,
- the second network starting unit starts the second network after the server is activated, and
- the second network joining unit joins the second network.

5. A network system according to claim 4, wherein,
- the first identification information is information different for each of the client devices,
- the network connecting device further includes an identification-information storing unit to store the first identification information,
- the second reading unit judges, when the first identification information is received, whether the received first identification information coincides with the first identification information stored in the identification-information storing unit, and
- the server activating unit activates the server when the received first identification information coincides with the first identification information stored in the identification-information storing unit.

6. A network connecting device connected at a server and used for network connection between devices conforming to a predetermined communication standard, the network connecting device comprising:
- a scanning unit to scan for a prefix of first identification information transmitted from a client device of a plurality of client devices that starts a first network, the prefix being the same for each client device included in the plurality of client devices in the network, and the first identification information including a predetermined identifier that designates the first network;
- a reading unit to read the first identification information located by the scanning unit and including the prefix;
- an option presenting unit to present to a user, as an option of joining the first network, the client device of the plurality of client devices including the first identification information read by the reading unit to the server;
- a first network joining unit to join the first network upon selection of the option; and
- a transmitting unit to transmit, to the selected client device upon joining the first network, a communication encryption key for joining a second network and second identification information designating the second network.

7. The network system according to claim 1, wherein the server further includes a display device that displays a connection manager that presents the option to join the first network.

8. A network connecting method for a network connecting device connected at a server and used for network connection between devices conforming to a predetermined communication standard, the network connecting method comprising:
- scanning, by a scanning unit, for a prefix of first identification information transmitted from a client device of a plurality of client devices that starts a first network, the prefix being the same for each client device included in the plurality of client devices in the network, and the first identification information including a predetermined identifier that designates the first network;
- reading, by a reading unit, the first identification information located by the scanning unit and including the prefix;
- presenting to a user, by an option presenting unit as an option of joining the first network, the client device of the plurality of client devices including the first identification information read by the reading unit of the server;
- joining, by a joining unit, the first network upon selection of the option by the server; and
- transmitting, by a transmitting unit to the selected client device upon joining the first network, a communication encryption key for joining a second network in the first network and second identification information designating the second network.

\* \* \* \* \*